United States Patent
Nelms et al.

(10) Patent No.: US 10,050,986 B2
(45) Date of Patent: *Aug. 14, 2018

(54) SYSTEMS AND METHODS FOR TRAFFIC CLASSIFICATION

(71) Applicant: DAMBALLA, INC., Atlanta, GA (US)

(72) Inventors: Terry Lee Nelms, Dallas, GA (US);
Andrew Hobson, Atlanta, GA (US);
Joseph Ward, Atlanta, GA (US)

(73) Assignee: Damballa, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,150

(22) Filed: Feb. 8, 2017

(65) Prior Publication Data

US 2017/0230393 A1    Aug. 10, 2017

Related U.S. Application Data

(63) Continuation of application No. 14/305,998, filed on Jun. 16, 2014, now Pat. No. 9,571,511.

(60) Provisional application No. 61/835,358, filed on Jun. 14, 2013.

(51) Int. Cl.
*H04L 29/06* (2006.01)

(52) U.S. Cl.
CPC ...... *H04L 63/1425* (2013.01); *H04L 63/1441* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 4,843,540 A | 6/1989 | Stolfo | |
| 4,860,201 A | 8/1989 | Stolfo et al. | |
| 5,363,473 A | 11/1994 | Stolfo et al. | |
| 5,497,486 A | 3/1996 | Stolfo et al. | |
| 5,563,783 A | 10/1996 | Stolfo et al. | |
| 5,668,897 A | 9/1997 | Stolfo | |
| 5,717,915 A | 2/1998 | Stolfo et al. | |
| 5,748,780 A | 5/1998 | Stolfo | |
| 5,920,848 A | 7/1999 | Schultzer et al. | |
| 6,401,118 B1 | 6/2002 | Thomas | |
| 6,738,908 B1 * | 5/2004 | Bonn | H04L 29/06 707/999.009 |
| 6,983,320 B1 | 1/2006 | Thomas et al. | |
| 7,013,323 B1 | 3/2006 | Thomas et al. | |

(Continued)

FOREIGN PATENT DOCUMENTS

| | | |
|---|---|---|
| WO | WO2002037730 A2 | 5/2002 |
| WO | WO2002/098100 A1 | 12/2002 |
| WO | WO2007/050244 A2 | 5/2007 |

OTHER PUBLICATIONS

AAS et al. "Text Categorisation: A Survey" (Jun. 1999) Norwegian Computing Center, pp. 1-38.

(Continued)

*Primary Examiner* — Malcolm Cribbs
(74) *Attorney, Agent, or Firm* — Pepper Hamilton LLP

(57) ABSTRACT

Systems and methods of classifying network traffic may monitor network traffic. Monitored traffic may be compared with a control protocol template (CPT). When a similarity between the monitored traffic and the CPT exceeds a match threshold, the monitored traffic may be associated with the CPT.

18 Claims, 10 Drawing Sheets

(56) References Cited

U.S. PATENT DOCUMENTS

| | | |
|---|---|---|
| 7,039,721 B1 | 5/2006 | Wu et al. |
| 7,043,759 B2 | 5/2006 | Kaashoek |
| 7,069,249 B2 | 6/2006 | Stolfo et al. |
| 7,093,292 B1 | 8/2006 | Pantuso |
| 7,136,932 B1 | 11/2006 | Schneider |
| 7,152,242 B2 | 12/2006 | Douglas |
| 7,162,741 B2 | 1/2007 | Eskin et al. |
| 7,185,368 B2 | 2/2007 | Copeland, III |
| 7,203,959 B2 | 4/2007 | Nachenberg et al. |
| 7,225,343 B1 | 5/2007 | Honig et al. |
| 7,277,961 B1 | 10/2007 | Smith et al. |
| 7,278,163 B2 | 10/2007 | Banzhof et al. |
| 7,290,283 B2 | 10/2007 | Copeland, III |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,475,426 B2 | 1/2009 | Copeland, III |
| 7,483,947 B2 | 1/2009 | Starbuck et al. |
| 7,487,544 B2 | 2/2009 | Schultz et al. |
| 7,512,980 B2 | 3/2009 | Copeland et al. |
| 7,519,818 B2 | 4/2009 | Levin et al. |
| 7,519,994 B2 | 4/2009 | Judge et al. |
| 7,536,360 B2 | 5/2009 | Stolfo et al. |
| 7,549,169 B1 | 6/2009 | Sobel et al. |
| 7,634,808 B1 | 12/2009 | Szor et al. |
| 7,639,714 B2 | 12/2009 | Stolfo et al. |
| 7,644,150 B1 | 1/2010 | Nucci et al. |
| 7,644,151 B2 | 1/2010 | Jerrim et al. |
| 7,657,935 B2 | 2/2010 | Stolfo et al. |
| 7,665,131 B2 | 2/2010 | Goodman et al. |
| 7,698,442 B1 | 4/2010 | Krishnamurthy |
| 7,712,132 B1 | 5/2010 | Ogilvie |
| 7,712,134 B1 | 5/2010 | Nucci et al. |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,809,670 B2 | 10/2010 | Lee et al. |
| 7,818,797 B1 | 10/2010 | Fan et al. |
| 7,882,542 B2 | 2/2011 | Neystadt |
| 7,886,358 B2 | 2/2011 | Copeland, III |
| 7,890,627 B1 | 2/2011 | Thomas |
| 7,895,326 B2 | 2/2011 | Jerrim et al. |
| 7,913,306 B2 | 3/2011 | Apap et al. |
| 7,930,353 B2 | 4/2011 | Chickering et al. |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone et al. |
| 8,019,764 B1 | 9/2011 | Nucci |
| 8,065,722 B2 | 11/2011 | Barford et al. |
| 8,074,115 B2 | 12/2011 | Stolfo et al. |
| 8,161,130 B2 | 4/2012 | Stokes et al. |
| 8,170,966 B1 | 5/2012 | Musat et al. |
| 8,180,916 B1 | 5/2012 | Nucci et al. |
| 8,200,761 B1 | 6/2012 | Tevanian |
| 8,224,994 B1 | 7/2012 | Schneider |
| 8,260,914 B1 | 9/2012 | Ranjan |
| 8,341,745 B1 | 12/2012 | Chau et al. |
| 8,347,394 B1 | 1/2013 | Lee |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2 | 9/2013 | Gabe |
| 8,566,928 B2 | 10/2013 | Dagon et al. |
| 8,578,497 B2 | 11/2013 | Antonakakis et al. |
| 8,631,489 B2 | 1/2014 | Antonakakis et al. |
| 8,667,583 B2 | 3/2014 | Polyakov et al. |
| 8,826,438 B2 | 9/2014 | Perdisci et al. |
| 8,832,829 B2 | 9/2014 | Manni et al. |
| 8,869,269 B1 | 10/2014 | Ramzan et al. |
| 9,166,994 B2 | 10/2015 | Ward et al. |
| 9,306,969 B2 | 4/2016 | Dagon et al. |
| 9,516,058 B2 | 12/2016 | Antonakakis et al. |
| 9,525,699 B2 | 12/2016 | Antonakakis et al. |
| 9,571,511 B2 | 2/2017 | Nelms et al. |
| 9,680,861 B2 | 6/2017 | Ward et al. |
| 9,686,291 B2 | 6/2017 | Antonakakis et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2002/0178238 A1 | 11/2002 | Fletcher |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0145233 A1* | 7/2003 | Poletto ............... H04L 63/1408 726/22 |
| 2003/0167308 A1* | 9/2003 | Schran .................. H04L 63/20 709/205 |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0039798 A1 | 2/2004 | Hotz et al. |
| 2004/0044791 A1 | 3/2004 | Pouzzner |
| 2004/0088346 A1 | 5/2004 | Yeager |
| 2004/0088348 A1 | 5/2004 | Yeager |
| 2004/0111636 A1 | 6/2004 | Baffes et al. |
| 2004/0181687 A1 | 9/2004 | Nachenberg et al. |
| 2004/0187032 A1 | 9/2004 | Geis et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0036501 A1 | 2/2005 | Chung et al. |
| 2005/0039019 A1 | 2/2005 | Delany |
| 2005/0044406 A1 | 2/2005 | Stute |
| 2005/0050377 A1* | 3/2005 | Chan ................... H04L 63/1433 714/4.3 |
| 2005/0060643 A1 | 3/2005 | Glass et al. |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0210534 A1* | 9/2005 | Krishnamurthy ... H04L 63/1408 726/23 |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho et al. |
| 2005/0281291 A1 | 12/2005 | Stolfo et al. |
| 2006/0015630 A1 | 1/2006 | Stolfo et al. |
| 2006/0015722 A1 | 1/2006 | Rowan et al. |
| 2006/0026682 A1* | 2/2006 | Zakas .................. H04L 29/06 726/22 |
| 2006/0031483 A1 | 2/2006 | Lund et al. |
| 2006/0067240 A1* | 3/2006 | Kim .................... H04L 41/142 370/242 |
| 2006/0068806 A1 | 3/2006 | Nam |
| 2006/0075084 A1 | 4/2006 | Lyon |
| 2006/0075494 A1 | 4/2006 | Bertman et al. |
| 2006/0078096 A1 | 4/2006 | Poyhonen |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1 | 8/2006 | Flanagan et al. |
| 2006/0176822 A1 | 8/2006 | Doyle et al. |
| 2006/0178994 A1 | 8/2006 | Stolfo et al. |
| 2006/0200539 A1 | 9/2006 | Kappler et al. |
| 2006/0212925 A1 | 9/2006 | Shull |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon et al. |

(56) References Cited

U.S. PATENT DOCUMENTS

| | | |
|---|---|---|
| 2006/0253584 A1 | 11/2006 | Dixon |
| 2006/0259967 A1 | 11/2006 | Thomas et al. |
| 2006/0265436 A1 | 11/2006 | Edmond |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand et al. |
| 2007/0136455 A1 | 6/2007 | Lee et al. |
| 2007/0162587 A1 | 7/2007 | Lund et al. |
| 2007/0198679 A1 | 8/2007 | Duyanovich et al. |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |
| 2008/0060054 A1 | 3/2008 | Srivastava |
| 2008/0060071 A1 | 3/2008 | Hennan et al. |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0201779 A1 | 8/2008 | Tahan et al. |
| 2008/0222729 A1 | 9/2008 | Chen et al. |
| 2008/0229415 A1 | 9/2008 | Kapoor et al. |
| 2008/0262985 A1 | 10/2008 | Cretu et al. |
| 2008/0263659 A1 | 10/2008 | Alme |
| 2008/0276111 A1 | 11/2008 | Jocoby et al. |
| 2009/0055929 A1 | 2/2009 | Lee et al. |
| 2009/0083855 A1 | 3/2009 | Apap et al. |
| 2009/0106304 A1 | 4/2009 | Song et al. |
| 2009/0138590 A1 | 5/2009 | Lee et al. |
| 2009/0171871 A1 | 7/2009 | Zhang et al. |
| 2009/0193293 A1 | 7/2009 | Stolfo et al. |
| 2009/0193497 A1* | 7/2009 | Kikuchi ............... G06F 21/54 726/1 |
| 2009/0198997 A1 | 8/2009 | Yeap et al. |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako et al. |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0074112 A1* | 3/2010 | Derr ..................... H04L 41/12 370/232 |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng et al. |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt et al. |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0225644 A1* | 9/2011 | Pullikottil ........... H04L 63/1425 726/11 |
| 2012/0079101 A1 | 3/2012 | Muppala |
| 2012/0084860 A1 | 4/2012 | Cao et al. |
| 2012/0102568 A1 | 4/2012 | Tarbotton |
| 2012/0117641 A1 | 5/2012 | Holloway et al. |
| 2012/0143650 A1 | 6/2012 | Crowley et al. |
| 2012/0151585 A1 | 6/2012 | Lamastra et al. |
| 2012/0215909 A1* | 8/2012 | Goldfarb ............... H04L 43/026 709/224 |
| 2013/0054802 A1 | 2/2013 | Donzis et al. |
| 2013/0174253 A1 | 7/2013 | Thomas et al. |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1 | 3/2014 | Ward et al. |
| 2014/0074838 A1* | 3/2014 | Akoglu ............... H04L 63/1425 707/737 |
| 2014/0090058 A1 | 3/2014 | Ward et al. |
| 2014/0289854 A1 | 9/2014 | Mahvi |
| 2015/0026808 A1 | 1/2015 | Perdisci et al. |
| 2015/0222654 A1 | 8/2015 | Crowley et al. |
| 2016/0156660 A1 | 6/2016 | Dagon et al. |
| 2016/0285894 A1 | 9/2016 | Nelms et al. |

OTHER PUBLICATIONS

Abad et al. "Log Correlation for Intrusion Detection: A Proof of Concept" (2003) In Proceedings of the 19$^{th}$ Annual Computer Security Application Conference (ACSAC '03) (11 pages).

Adamic et al. "Zipf's Law and the Internet" (2002) *Glottometrics* 3:143-150.

Akritidis et al. "Efficient Content-Based Detection of Zero-Day Worms" (May 2005) IEEE International Conference in Communications 2:837-843.

Alam et al. "Webinar: Intel Virtualization Technology of Embedded Applications" (2010) Intel (34 pages).

Alexa "Alexa Search—Beta" (retrieved from Internet Archive on May 23, 2013, Archived Sep. 25, 2006) http://www.alexa.com, pp. 1-3.

Alliance "Collaborative Malware Collection and Sensing" (retrieved from Internet Archive on May 23, 2013, Archived Jan. 7, 2007) https://alliance.mwcollect.org, pp. 1-2.

Anagnostakis et al. "Detecting Targeted Attacks Using Shadow Honeypots" (2005) Proceedings of the 14$^{th}$ USENIX Security Symposium pp. 129-144.

Anderson et al. "Spamscatter: Characterizing Internet Scam Hosting Infrastructure" (Aug. 6-10, 2007) Proceedings of the USENIX Security Symposium, Article 10 (14 pages).

Andrews "Negative Caching of DNS Queries (DNS NCACHE)" (Mar. 1998) http://tools.ietf.org/html.rfc2308 (20 pages).

Antonakakis e tal. "Building a Dynamic Reputation System for DNS" (Aug. 11-13, 2010) *19$^{th}$ USENIX Security Symposium*, Washington, DC (17 pages).

(56) References Cited

OTHER PUBLICATIONS

Antonakakis et al. "Detecting Malware Domains in the Upper DNS Hierarchy" (Aug. 8-12, 2011) *Proceedings of the 20th USENIX Security Symposium*, Washington, DC pp. 1-16.
Antonakakis et al. "From Throw-Away Traffic to Bots: Detecting the Rise of DGA-Based Malware" (2012) *Proceedings of the 21st USENIX Conference on Security Symposium*, Washington, DC (16 pages).
Antonakakis et al. "The Command Structure of the Aurora Bonet" (2010) http://www.damballa.com/downloads/r_pubs/Aurora_Botnet_Command_Structure.pdf (31 pages).
Antonakakis et al. "Unveiling the Network Criminal Infastructure of TDSS/TDL4" (undated) http://www.damballa.com/downloads/r_pubs/Damballa_tdss_td14_case_study_public.pdf (16 pages).
Anubis "Analyzing Unknown Binaries" (retrieved from Internet Archive on May 23, 2013, Archived Apr. 9, 2008) http://anubis.seclab.tuwien.ac.at, pp. 1-2.
Arends et al. "DNS Security Introduction and Requirements" (Mar. 2005) http://www.ietf.org/rfc/rfc4033.txt (20 pages).
Arends et al. "Protocol Modifications for the DNS Security Extensions" (Mar. 2005) http://www.ietf.org/rfc/rfc4035.txt (50 pages).
Arends et al. "Resource Records for the DNS Security Extensions" (Mar. 2005) http://www.ietf.org/rfc/rfc4034.txt (20 pages).
Avira "More than security" (retrieved from Internet Archive on May 23, 2013, Archived Sep. 29, 2006) http://www.avira.com, pp. 1-13.
Axelsson "The Base-Rate Fallacy and the Difficulty of Intrusion Detection" (Aug. 2000) *ACM Transactions on Information and System Security* 3(3):186-205.
Bacher et al. "Know Your Enemy: Tracking Botnets: Using Honeynets to Learn More About Bots" (Mar. 13, 2005) http://www.honeynet.org/papers/bots (8 pages).
Baecher et al. "The Nepenthes Platform: An Efficient Approach to Collect Malware" (Sep. 2006) Proceedings of Recent Advances in Intrusion Detection (RAID 2006) LNCS 4219, pp. 165-184.
Bailey et al. "Automated Classification and Analysis of Internet Malware" (Apr. 26, 2007) RAID 2007, LNCS 4637, pp. 178-197.
Barford et al. "An Inside Look at Botnets" (2006) Special Workshop on Malware Detection, Advances in Information Security, Spring Verlag, pp. 171-192.
Barham et al. "Xen and the Art of Virtualization" (Oct. 19-22, 2003) Proceedings of the 19th AMC Symposium (SOSP'03) pp. 164-177.
Bayer et al. "Scalable, Behavior-Based Malware Clustering" (Feb. 10, 2009) Network and Distributed System Security Symposium (18 pages).
Bayer et al. "TTAnalyze: A Tool for Analyzing Malware" (2006) Proceedings of the 15th Annual Conference European Institute for Computer Antivirus Research (EICAR), pp. 180-192.
Bellard "QEMU, A Fast and Portable Dynamic Translator" (2005) USENIX Annual Technical Conference, pp. 41-46.
Berger et al. "Assessing the Real-World Dynamics of DNS" (2012) *Lecture Notes in Computer Science* 7189:1-14.
Berk et al. "Using Sensor Networks and Data Fusion for Early Detection of Active Worms" (2003) Sensors, and Command, Control, Communications, and Intelligence (C3iI) Technologies for Homeland Defense and Law Enforcement II, Proceedings of SPIE 5071:92-104.
Berners-Lee et al. "RFC3986—Uniform Resource Identifier (URI): Generic Syntax" (Jan. 2005) http://www.hjp.at/doc/rfc/rfc3986.html (62 pages).
Biles "Detecting the Unknown with Snort and Statistical Packet Anomaly Detecting Engine" (2003) www.cs.luc.edu/~pld/courses/447/sum08/class6/biles.spade.pdf pp. 1-9.
Bilge et al. "Exposure: Finding Malicious Domains Using Passive DNS Analysis" (Feb. 6-9, 2011) 18th Annual Network and Distributed System Security Symposium (17 pages).
Binkley et al. "An Algorithm for Anomaly-Based Botnet Detection" (Jul. 7, 2006) 2nd Workshop on Steps to Reducing Unwanted Traffic on the Internet (SRUTI '06), pp. 43-48.
Bishop "Computer Security: Art and Science" (2003) Addison-Wesley Longman Publishing, Boston, MA.
Bishop "Pattern Recognition and Machine Learning" (2006) Springer-Verlag New York, Inc., Secauscus, NJ.
Bleedingsnort "Bleeding Edge Snort" (retrieved from Internet Archive on May 23, 2013, Archived Sep. 26, 2006) http://www.bleedingsnort.com, pp. 1-3.
Borders et al. "Protecting Confidential Data on Personal Computers With Storage Capsules" (2009) 18th USENIX Security Symposium, pp. 367-382.
Borders et al. "Siren: Catching Evasive Malware (Short Paper)" (May 21-24, 2006) IEEE Symposium on Security and Privacy, pp. 78-85.
Breiman "Bagging Predictors" (1996) *Machine Learning* 24:123-140.
Brumley et al. "Automatically Identifying Trigger-Based Behavior in Malware: Botnet Detection" (2008) pp. 1-24.
Brumley et al. "Tracking Hackers on IRC" (Dec. 8, 1999) http://www.doomded.com/texts.ircmirc/TrackingHackersonIRC.com.htm pp. 24-29.
Caballero et al. "Measuring Pay-Per-Install: The Commoditization of Malware Distribution" (2011) Proceedings of the 20th USENIX Conference on Security (SEC'11) pp. 1-16.
Caballero et al. "Polyglot: Automatic Extraction of Protocol Message Format Using Dynamic Binary Analysis" (Oct. 2007) Proceedings of ACM Conference on Computer and Communication Security pp. 1-15.
Canavan "Symantec Security Response: W32.Bobax.D" (May 26, 2004) http://www.sarc.com/avcent/venc/data/w32.bobax.d.html, pp. 1-6.
Chang et al. "LIBSVM: A Library for Support Vector Machines" (Jun. 14, 2007) ACM Transactions on Intelligent Systems and Technology, pp. 1-26.
Cheung et al. "Modeling Multistep Cyber Attacks for Scenario Recognition" (Apr. 22-24, 2003) Proceedings of the Third DARPA Information Survivability Conference and Exposition (DISCEX III) 1:284-292.
Christodorescu et al. "Mining Specifications on Malicious Behavior" (Sep. 3-7, 2007) ESEC/FSE'07, pp. 1-10.
Christodorescu et al. "Semantics-Aware Malware Detection" (2005) In Proceedings of the 2005 IEEE Symposium on Security and Privacy, pp. 32-46.
Cipher Trust "Zombie Stats" (Mar. 25, 2009) http://www.ciphertrust.com/resources/statistics/zombie.php, pp. 1-3.
Collins et al. "Hit-List Worm Detection and Bot Identification in Large Networks Using Protocol Graphs" (2007) RAID 2007, LNCS 4637, pp. 276-295.
Common Vulnerabilities and Exposures "CVE-2006-3439" (Jun. 27, 2012) http://cve.mitre.org/cgi-bin/cvename.cgi?name=CVE-2006-3439, pp. 1-7.
Conficker Working Group "Conficker Working Group: Lessons Learned" (Jan. 2011) Conficker_Working_Group_Lessons_Learned_Jun._17,_2010_final.pdf, pp. 1-59.
Cooke et al. "The Zombie Roundup: Understanding, Detecting, and Disrupting Botnets"(Jun. 2005) USENIX Workshop on Steps to Reducing Unwanted Traffic on the Internet (SRUTI '05), pp. 39-44.
Cristianini et al. "An Introduction to Support Vector Machines: and other Kernal-Based Learning Methods" (2000) Cambridge University Press, New York, NY, USA.
Cuppens et al. "Alert Correlation in a Cooperative Intrusion Detection Framework" (2002) Proceedings of IEEE Symposium on Security and Privacy 2002, pp. 202-215.
Cyber-Ta, http://cyber-ta.org/releases/botHunter/index.html, retrieved from Internet Archive on May 23, 2013, Archived Aug. 30, 2007, pp. 1-6.
Dagon et al. "Corrupted DNS Resolution Paths" The Rise of a Malicious Resolution Authority (2008) Proceedings of Network and Distributed Security Symposium (NDSS '08), pp. 1-15.
Dagon et al. "HoneyStat: Local Worm Detection Using Honeypots" (2004) RAID 2004, LNCS 3224, pp. 39-58.
Dagon et al. "Modeling Botnet Propagation Using Time Zones" (Feb. 2-3, 2006) The 13th Annual Network and Distributed System Security Symposium 2006 (18 pages).

(56) References Cited

OTHER PUBLICATIONS

Dagon et al. "Worm Population Control Through Periodic Response" (Jun. 2004) Technical Report, Georgia Institute for Technology, pp. 1-12.
Daley et al. "Epidemic Modeling: An Introduction" (1999) Cambridge University Press, United Kingdom, pp. vii-ix, 7-15, and 27-38.
Damballa webpage (retrieved from Internet Archive on May 23, 2013, Archived Jan. 28, 2007) http://damballa.com, pp. 1-10.
Danchev "Leaked DIY Malware Generating Tool Spotted in the Wild" (Jan. 18, 2013) (6 pages) http://blog.webroot.com/2013/01/18/leaked-diy-malware-generating-tool-spotted-in-the-wild.
Danchev "Web Based Botnet Command and Control Kit 2.0" (Aug. 22, 2008) http://ddanchev.blogspot.com/2008/08/web-based-botnet-command-and-control.html. (5 pages).
De La Higuera et al. "Topology of Strings: Median String is NP-Complete" (2000) Theoretical Computer Science 230:39-48.
Diekmann et al. "Mathematical Epidemiology of Infectious Diseases: Model Building, Analysis and Interpretation" (2000) John Wiley & Son, Ltd., New York, NY, pp. v-xv and 1-303.
Dietrich et al. "Analyzing Distributed Denial of Service Tools: The Shaft Case" (Dec. 3-8, 2000) Proceedings of the 14$^{th}$ Systems Administration Conference (LISA 2000), New Orleans, Louisiana, USA, pp. 329-339.
Dihe's IP-Index Browser (updated Oct. 13, 2012) http://ipindex.homelinux.net/index.php. (1 page).
Dinaburg et al. "Ether: Malware Analysis Via Hardware Virtualization Extensions" (Oct. 27-31, 2008) CCS'08, pp. 1-12.
Dingledine et al. "Tor: The Second-Generation Onion Router" (Aug. 9-13, 2004) Proceedings of the 13$^{th}$ USENIX Security Symposium, pp. 303-320.
Dittrich "Active Response Continuum Research Project" (Nov. 14, 2005) http://staff.washington.edu/dittrich/arc (4 pages).
DMOZ Open Directory Project, Dynamic DNS Providers List (Aug. 8, 2007) http://dmoz.org/Computers/Software/Internet/Servers/Address_Management/Dynamic_DNS_Services.
DNSWL1 "DNS Whitelist—Protection Against False Positives" (retrieved from Internet Archive on May 23, 2013, Archived Jul. 15, 2006) http://www.dnswl.org, pp. 1-4.
DShield "Distributed Intrusion Detection System" (retrieved from Internet Archive on May 23, 2013, Archived Sep. 29, 2006) http://www.dshield.org, pp. 1-2.
Duda et al. "Pattern Classification, Second Edition" (2001) John Wiley & Sons, Inc., New York, NY, pp. vii-xx, and 1-654.
Dyninst "An application program interface (API) for runtime code generation" (retrieved from Internet Archive on May 23, 2013, Archived Aug. 20, 2006) http://www.dyninst.org, pp. 1-2.
Eckman et al. "STATL: An Attack Language for State-Based Intrusion Detection" (2002) *Journal of Computer Security* 10:71-103.
Edmonds "ISC Passive DNS Architecture" (Mar. 2012) http://kb.isc.org/getAttach/30/AA-00654/passive-dns-architecture pp. 1-18.
Egele et al. "A Survey on Automated Dynamic Malware-Analysis Techniques and Tools" (Feb. 2012) *ACM Computing Surveys* 44(2)(6):1-6:42.
Ellis et al. "A Behavioral Approach to Worm Detection" (Oct. 29, 2004) WORM'04, pp. 1-11.
Erdogan et al. "Hash-AV: Fast Virus Signature Matching by Cache-Resident Filters" (2007) *Int. J. Secur. Netw.* 2:50-59.
Eris Free Network"Efnet Chat Network" (retrieved Dec. 27, 2016) http://www.efnet.org, pp. 1-3.
Falliere et al. "W32.Stuxnet Dossier" (Feb. 2011) http://www.symantec.com/content/en/us/enterprise/media/security_response/whitepapers/w32_stuxnet_dossier.pdf, Version 1.4:1-69.
Feldman et al. "The Text Mining Handbook: Advance Approaches in Analyzing Unstructured Data" (2007) Cambridge Univ. Press, New York, NY (TOC).
Felegyhazi et al. "On the Potential of Proactive Domain Blacklisting" (2010) Third USENIX LEET Workshop, pp. 1-8.

Ferrie "Anti-Unpacker Tricks" (2008) Proceedings of the 2$^{nd}$ International CARO Workshop, pp. 1-25.
Ferrie "Attacks on More Virtual Machine Emulators" (2007) *Symantec Advance Threat Research*, http://pferrie.tripod.com/papers/attacks2.pdf (17 pages).
Ferrie "Attacks on Virtual Machine Emulators" (2006) *Symantec Advance Threat Research* (13 pages).
Fisher "Thwarting the Zombies" (Mar. 31, 2003) pp. 1-2.
Fisher "Zeus Source Code Leaked" (May 10, 2011) http://threatpost.com/en_us/blogs/zeus-source-code-leaked-051011 (6 pages).
Fogla et al. "Polymorphic Blending Attacks" (2006) Proceedings of 15$^{th}$ USENIX Security Symposium, pp. 241-256.
Freiling et al. "Botnet Tracking: Exploring a Root-Cause Methodology to Prevent Distributed Denial-of-Service Attacks" (2005) ESORICS 2005, LNCS 3679, pp. 319-335.
Fuller et al. "RFC 1519—Classless Inter-Domain Routing (CIDR): An Address Assignment and Aggregation Strategy" (Sep. 1993) http://www.faqs.org/rfcs/rfc1519.html pp. 1-30.
Garera et al. "A Framework for Detection and Measurement of Phishing Attacks" (Nov. 2, 2007) WORM'07, pp. 1-8.
Garfinkel et al. "A Virtual Machine Introspection Based Architecture for Intrusion Detection" (Feb. 2003) Proceedings of Network and Distributed Systems Security Symposium, pp. 1-16.
Geide "Another Trojan Barnital Pattern" (May 6, 2011) http://research.zscaler.com/2011/05/another-trojan-bamital-pattern.html pp. 1-5.
Gil "NSTX (IP-over-DNS) Howto" (Nov. 4, 2005) http://thomer.com/howtos/nstx.html pp. 1-5.
Glenn "A Summary of DoS/DdoS Prevention, Monitoring and Mitigation Techniques in a Service Provider Environment" (Aug. 21, 2003) *SANS Institute 2003*, pp. ii-iv, and 1-30.
Goebel "Rishi: Identify Bot Contaminated Hosts by IRC Nickname Evaluation" (Apr. 10, 2007) Hot Bots'07, pp. 1-12.
Gomes et al. "Characterizing a Spam Traffic" (Oct. 25-27, 2004) ACM SIGCOMM Internet Measurement Conference (IMC '04), Taormina, Sicily, Italy, pp. 356-369.
Gostev "Malware Evolution: Jan.-Mar. 2005" (Apr. 18, 2005) Viruslist.com http://viruslist.com/en/analysis?pubid=162454316, pp. 1-8.
Gu et al. "Bothunter: Detecting Malware Infection Through IDS-Driven Dialog Correlation" (2007) Slides from Proceedings of 16$^{th}$ USENIX Security Symposium.
Gu et al. "BotMiner: Clustering Analysis of Network Traffic Protocol-and-Structure-Independent Botnet Detection" (2008) USENIX Security Symposium, pp. 139-154.
Gu et al. "BotSniffer: Detecting Botnet Command and Control Channels in Network Traffic" (Feb. 2008) Proceedings of the 1th Annual Network and Distributed System Security Symposium (NDSS'08), pp. 1-18.
Gunderson "Global Ipv6 Statistics: Measuring the Current State of Ipv6 for Ordinary Users" (Oct. 24-30, 2008) http://meetings.ripe.net/ripe-57/presentations/Colitti-Global_Ipv6_statistics_-_Measuring_the_current_state_of_Ipv6_for_ordinary_users_.7gzD.pdf (slides 20 pages).
Guo et al. "A Study of the Packer Problem and Its Solutions" (2008) Recent Advances in Intrusion Detection (RAID 2008), LNCS 5230, pp. 95-115.
Halkidi et al. "On Clustering Validation Techniques" (2001) *Journal of Intelligent Information Systems* 17:107-145.
Handlers (jclausing) (printed May 24, 2013) http://handlers.sans.org/jclausing/userdb.txt, pp. 1-149.
Hanna "Using Snort to Detect Rogue IRC Bot Programs" (Oct. 8, 2004) Technical Report, SANS Institute 2004, pp. 1-17.
Hao et al. "An Internet-Wide View into DNS Lookup Patterns" (2010) http://labs.verisign.com/projects/malicious-domain-names/white-paper/dns-imc2010.pdf, pp. 1-6.
Hao et al. "Detecting Spammers with SNARE: Spatiotemporal Network-Level Automatic Reputation Engine" (2009) 18$^{th}$ USENIX Security Symposium, pp. 101-117.
Hardin "The Scanner Tarpit Howto" (Jul. 20, 2002) http://www.impsec.org/linus/security/scanner-tarpit.html, Intro and TOC.

(56) References Cited

OTHER PUBLICATIONS

Heinz et al. "IP Tunneling Through Nameserver" (Sep. 10, 2000) http://slahdot.org/story/00/09/10/2230242/ip-tunneling-through-nameservers, pp. 1-23.

Higgins "Hacking a New DNS Attack: DNS Expert Disputes Georgia Tech and Google Research That Points to Malicious Deployment of Certain Types of DNS Servers" (Dec. 18, 2007) http://darkreading.com/taxonomy/index/printarticle/id/208803784, (2 pages).

Higgins "Shadowserver to Build 'Sinkhole' Server to Find Errant Bots: New Initiative Will Emulate IRC, HTTP Botnet Traffic" (Sep. 24, 2008) http://darkreading.com/taxonomy/index/printarticle/id/211201241, (1 page).

Hindocha et al. "Malicious Threats and Vulnerabilities in Instant Messaging" (Sep. 2003) Virus Bulletin International Conference, pp. 1-24.

Holz "Anti-Honeypot Technology" (Dec. 2004) $21^{st}$ Chaos Communication Congress, slides 1-57.

Holz et al. "A Short Visit to the Bot Zoo" (2005) IEEE Security & Privacy, pp. 76-79.

Holz et al. "Measuring and Detecting Fast-Flux Service Networks" (2008) Proceedings of NDSS (12 pages).

Honeynet Project & Research Alliance "Know Your Enemy: Fast-Flux Service Networks: An Ever Changing Enemy" (Jul. 13, 2007) http://old.honeynet.org/papers/ff/fast-flux.html, pp. 1-10.

Honeynets "Know Your Enemy: Honeynets" (May 31, 2006) http://www.honeypot.org/papers/honeynet, pp. 1-5.

Hothorn et al. "Double-Bagging: Combining Classifiers by Bootstrap Aggregation" (2003) *Pattern Recognition* 36:1303-1309.

Hund et al. "Return-Oriented Rootkits: Bypassing Kernel Code Integrity Protection Mechanisms" (2009) $18^{th}$ USENIX Security Symposium, pp. 383-398.

Hunt et al. "Detours: Binary Interception of WIN32 Functions" (Jul. 12-13, 1999) Proceedings of the $3^{rd}$ USENIX Windows NT Symposium, pp. 1-9.

Icann "Who is Privacy" (Jun. 3, 2005) www.gnso.icann.org/issues/whois-privacy/index/shtml.

Ilgun et al. "State Transition Analysis: A Rule-Based Intrusion Detection Approach" (Mar. 1995) IEEE Transactions on Software Engineering 21(3):181-199.

International Preliminary Report on Patentability for International Patent Application No. PCT/US2006/038611 dated Mar. 26, 2009.

International Search Report and Written Opinion for International Patent Application No. PCT/US2006/038611 dated Jul. 8, 2008.

Ishibashi e tal. "Detecting Mass-Mailing Worm Infected Hosts by Mining DNS Traffic Data" (Aug. 22-26, 2005) SIGCOMM''05 Workshops, pp. 159-164.

Jacob "Jackstraws: Picking Command and Control Connections from Bot Traffic" (2011) Proceedings of the $20^{th}$ USENIX Conference on Security (SEC'11), pp. 1-16.

Jain et al. "Algorithms for Clustering Data" (1988) Prentice-Hall, Inc., Englewood Cliffs, NJ.

Jain et al. "Data Clustering: A Review" (Sep. 1999) ACM Computing Surveys 31(3):264-323.

Jang et al. "Bitshred: Feature Hashing Malware for Scalable Triage and Semantic Analysis" (Oct. 17-21, 2011) Proceedings of the $18^{th}$ ACM Conference on Computer and Communications Security (CCS'11), pp. 309-320.

Jiang et al. "Cerias Tech Report 2005-24: Virtual Playgrounds for Worm Behavior Investigation" (Feb. 2005) Purdue University, West Lafayette, IN, pp. 1-16.

Jiang et al. "Identifying Suspicious Activities Through DNS Failure Graph Anaylsis" (2010) $18^{th}$ IEEE International Conference on Network Protocols (ICNP' 10) Washington, DC, pp. 144-153.

Jiang et al. "Profiling Self-Propagating Worms Via Behavioral Footprinting" (Nov. 3, 2006) WORM'06 (7 pages).

Jiang et al. "Stealthy Malware Detection Through VMM-Based" (Oct. 29-Nov. 2, 2007) Out-of-the-Box Semantic View Reconstruction, CCS'07 (11 pages).

Jiang et al. "Virtual Playgrounds for Worm Behavior Investigation" (2006) RAID 2005, LNCS 3858 (15 pages).

John et al. "Studying Spamming Botnets Using Botlab" (2009) USENIX Symposium on Networked Systems Design and Implementation (NDSI), pp. 1-15.

Jones et al. "The IPM Model of Computer Virus Management" (1990) *Computers & Security* 9:411-418.

Jung "Fast Portscan Detection Using Sequential Hypothesis Testing" (2004) IEEE Symposium on Security Privacy, pp. 211-225.

Jung et al. "An Empirical Study of Spam Traffic and the Use of DNS Black Lists" (Oct. 25-27, 2004) ACM SIGCOMM Internet Measurement Conference (ICM '04), Taormina, Sicily, Italy, pp. 370-375.

Jung et al. "DNS Performance and the Effectiveness of Caching" (Oct. 2002) IEEE/ACM Transactions on Networking 10(5):589-603.

Jung et al. "Modeling TTL-Based Internet Caches" (Mar. 2003) IEEE INFOCOM 2003, pp. 417-426.

Kalt "RFC 2810—Internet Relay Chat: Architecture" (Apr. 2000) http://faqs.org/rfcs/rfc2810.html, pp. 1-12.

Kandula et al. "Botz-4-Sale: Surviving Organized DdoS Attacks That Mimic Flash Crowds" (2004) Technical Report LCS TR-969, Laboratory for Computer Science, MIT, pp. 1-14.

Kang et al. "Renovo: A Hidden Code Extract for Packed Executables" (Nov. 2, 2007) WORM'07, pp. 1-8.

Karasaridis et al. "Wide-Scale Botnet Detection and Characterization" (Apr. 11-13, 2007) USENIX Workshop on Hot Topics in Understanding Botnets, HotBots'07, pp. 1-8.

Kaspersky Lab's Global Research & Analysis Team (GreAT), "Full Analysis of Flame's Command & Control Servers" (Sep. 17, 2012) http://www.securelist.com/en/blog/750/Full_Analysis_of_Flames_Command_Control_Servers, pp. 1-19.

Kephart et al. "Directed-Graph Epidemiological Models of Computer Viruses" (1991) IEEE Symposium on Security and Privacy, pp. 343-359.

Kienzle et al. "Recent Worms: A Survey and Trends" (Oct. 27, 2003) in WORM '03 ACM Workshop on Rapid Malcode, Washington, DC, USA, pp. 1-10.

Kim et al. "Autograph: Toward Automated, Distributed Worm Signature Detection" (2004) USENIX Security Symposium, pp. 1-22.

Kim et al. "Measurement and Analysis of Worm Propagation on Internet Network Topology" (2004) IEEE, pp. 495-500.

Kim et al. "Request Rate Adaptive Dispatching Architecture for Scalable Internet Server" (2000) IEEE International Conference on Cluster Computing (CLUSTER'00); pp. 289-296.

Kivity et al. "KVM: The Linux Virtual Machine Monitor" (Jun. 27-30, 2007) Linux Symposium, pp. 225-230.

Kolbitsch et al. "Effective and Efficient Malware Detection at the End Host" (2009) $18^{th}$ USENIX Security Symposium, pp. 351-366.

Kolter et al. "Learning to Detect and Classify Malicious Executables in the Wild" (Dec. 2006) *Journal of Machine Learning Research* 7:2721-2744.

Krasser et al. "Real-Time and Forensic Network Data Analysis Using Animated and Coordinated Visualization" (Jun. 2005) $6^{th}$ IEEE Information Assurance Workshop, pp. 1-8.

Krebs "Bringing Botnets Out of the Shadows" (Mar. 21, 2006) Washingtonpost.com, http://www.washingtonpost.com/wp-dyn/content/article/2006/03/21/AR2006032100279_pf.html, pp. 1-4.

Krebs "Ecological Methodology" (1989) Harper & Row, Publishers, New York, pp. v-x, 15-37, 155-166, and 190-194.

Kreibich "Honeycomb: Automated NIDS Signature Creation Using Honeypots" (2003) http://www.cl.cam.ac.uk/research/srg/netos/papers/2003-honeycomb-signcomm-poster.pdf (1 page).

Kreibich "Honeycomb: Automated Signature Creation Using Honeypots" (Mar. 26, 2007) http://www.icir.org/christian/honeycomb/index.html (3 pages).

Kreibich et al. "Honeycomb—Creating Intrusion Detection Signatures Using Honeypots" (2003) ACM Workshop on Hot Topics in Networks (6 pages).

Krishnan et al. "DNS Prefetching and Its Privacy Implications: When Good Things Go Bad" (2010) $3^{rd}$ USENIX Conference on

(56) References Cited

OTHER PUBLICATIONS

Large-Scale Exploits and Emergent Threats: Botnets, Spyware, Worms, and More (LEET'10), pp. 1-9.
Kruegel et al. "Anomaly Detection of Web-Based Attacks" (Oct. 27-31, 2003) 10th ACM Conference on Computer and Communication Security (CCS '03), Washington, DC, USA, pp. 251-261.
Kruegel et al. "Detecting Kernel-Level Rootkits Through Binary Analysis" (Dec. 2004) Annual Computer Security Applications Conference (ACSAC), pp. 91-100.
Kruegel et al. "Polymorphic Worm Detection Using Structural Information of Executables" (2005) RAID 2005, pp. 207-226.
Krzywinski "Port Knocking—Network Authentication Across Closed Ports" (2003) *Sys Admin Magazine* 12:12-17.
Landwehr et al. "Logistic Model Trees" (2005) *Machine Learning* 59:161-205.
Laurikari "TRE" (Jul. 22, 2006) https://github.com/laurikari/tre/blob/master/tre.spec, pp. 1-3.
Li et al. "Hamsa: Fast Signature Generational for Zero-Day Polymorphic Worms with Provable Attack Resilience" (2006) IEEE Symposium on Security and Privacy, pp. 1-15.
Ligh et al. "Malware Analyst's Cookbook and DVD" (2010) Wiley Publishing, Indianapolis, IN.
Liston "Welcome to my Tarpit: The Tactical and Strategic Use of LaBrea" (Oct. 24, 2001) http://www.hackbusters.net/LaBrea/LaBrea.txt, pp. 1-4.
Livades et al. "Using Machine Learning Techniques to Identify Botnet Traffic" (2006) 2nd IEEE LCN Workshop on Network Security (WoNS'2006), pp. 967-974.
Lockdown Corp. "LockDown Security Bulletin—Sep. 23, 2001", http://lockdowncorp.com/bots, pp. 1-8.
LURHQ Threat Intelligence Group "Dabber Worm Analysis" (May 13, 2004) http://www.lurhq.com/dabber.html, pp. 1-4.
Ma "NetGeo—The Internet Geographic Database" (Sep. 6, 2006) http://www.caida.org/tools/utilities/netgeo/index.xml, pp. 1-2.
Malware Domains "DNS—BH Malware List" (retrieved from Internet Archive on May 23, 2013, Archived Dec. 28, 2007) httpa://malwaredomains.com, pp. 1-12.
Mao et al. "A Precise and Efficient Evaluation of the Proximity Between Web Clients and Their Local DNS Servers" (2002) USENIX Annual Technical Conference, pp. 1-14.
Martignoni et al. "OmniUnpack: Fast, Generic, and Safe Unpacking of Malware" (2007) Annual Computer Security Applicatoins Conference (ACSAC), pp. 431-441.
Marx "Outbreak Response Times: Putting AV to the Test" (Feb. 2004) www.virusbtn.com, pp. 4-6.
MathWorks Inc. "Simulink—Simulation and Model-Based Design" (Dec. 31, 2005) http://www.mathworks.com/products/simulink, pp. 1-2.
McAfee "About McAfee Security" (printed May 23, 2013) http://www.mcafee.com/us, pp. 1-23.
McCarty "Botnets: Big and Bigger" (2003) IEEE Security and Privacy Magazine 1:87-89.
Mekky et al. "Detecting Malicious HTTP Redirections Using Trees of User Browser Activity" (2014) *IEEE INFOCOM 2014*, pp. 1159-1167.
Microsoft Encyclopedia "Trojan: Java/Boonan" (last published Apr. 16, 2011) http://microsoft.com/security/portal/threat/encyclopedia/entry.apsx?Name=Trojan%3Ajava%2Fboonan, pp. 1-2.
Mirkovic et al. "Internet Denial of Service: Attack and Defense Mechanisms" (2004) Prentice Hall Professional Technical Reference, pp. v-xxii and 1-372.
Mockapetris "Domain Names—Concepts and Facilities" (Nov. 1987) Network Working Group, http://www.ietf.org/rfc/rfc1034.txt, pp. 1-52.
Mockapetris "Domain Names—Implementation and Specification" (Nov. 1987) Network Working Group, http://www.ietf.org/rfc/rfc1035.txt, pp. 1-52.
Moore "Inferring Internet Denial-of-Service Activity" (Aug. 13-17, 2001) 10th USENIX Security Symposium, pp. 1-14.

Moore "Network Telescopes: Observing Small or Distant Security Events" (Aug. 8, 2002) http://www.caida.org/publications/presentations/2002/usenix_sec/usenix_sec_2002_files/frame.htm, pp. 1-64.
Moore et al. "Code-Red: A Case Study on the Spread and Victims of an Internet Worm" (2002) http://www.icir.org/vern/imw-2002/imw2002-papers/209.ps/gz, pp. 1-12.
Moore et al. "Internet Quarantine: Requirements for Containing Self-Propagating Code" (Mar. 2003)IEEE INFOCOM 2003, pp. 1-10.
Moore et al. "Slammer Worm Dissection: Inside the Slammer Worm" (Jul.-Aug. 2003) IEEE Security & Privacy 1(4):33-39.
Mozilla Foundation "Public Suffix List" (printed May 23, 2013) http://publicsuffic.org/, pp. 1-8.
Newman "Networks: An Introduction" (Sep. 2010) Oxford University Press (TOC).
Newsome et al. "Paragraph: Thwarting Signature Learning by Training Maliciously" (2005) Recent Advance in Intrusion Detection (RAID), pp. 1-21.
Newsome et al. "Polygraph: Automatically Generating Signatures for Polymorphic Worms" (2005) IEEE Symposium on Security and Privacy (16 pages).
Ning et al. "Constructing Attack Scenarios Through Correlation of Intrusion Alerts" (Nov. 18-22, 2002) Computer and Communications Security (CCS'02), pp. 1-10.
Norman "Norman Sandbox Whitepaper", Copyright Norman 2003, pp. 1-19.
OARCI Website Development Group (retrieved from Internet Archive on Apr. 11, 2014, Archived Apr. 12, 2008) http://malfease.oarci.net, pp. 1-9.
Oberheide et al. "CloudAV: N-Version Antivirus in the Network Cloud" (2008) 17th USENIX Security Symposium, pp. 91-106.
OpenDNS "OpenDNS Makes Your Internet Work Better" (retrieved from Internet Archive May 23, 2013, Archived Sep. 9, 2006) http://www.opendns.com, pp. 1-25.
OREANS "Understanding the Risks"( retrieved from Internet Archive on May 23, 2013, Archived Aug. 23, 2006) http://www.oreans.com/themida.php, pp. 1-12.
Overton "Bots and Botnets: Risks, Issues and Prevention" (Oct. 5-7, 2005) 2005 Virus Bulletin Conference at the Burlington, Dublin, Ireland, http://arachnid.homeip.net/papers/VB2005-Bots_and_Botnets-1.0.2.pdf, pp. 1-28.
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.
Paxson "Bro: A System for Detecting Network Intruders in Real-Time" (Jan. 26-29, 1998) 7th USENIX Security Symposium, pp. 1-22.
PEID "PEID detects most common packers, cryptors and compliers for PE files" (retrieved from Internet Archive on May 23, 2013, Archived Dec. 4, 2007) http://www.peid.info, pp. 1-2.
Pelleg et al. "X-Means: Extending K-Means with Efficient Estimation of the Number Of Clusters" (2000 International Conference on Machine Learning, pp. 1-8.
Perdisci et al. "Behavioral Clustering of HTTP-Based Malware and Signature Generation Using Malicious Network Traces" (2010) USENIX Symposium on Networked Systems Design and Implementation (NSDI 2010), pp. 1-16.
Perdisci et al. "Detecting Malicious Flux Service Networks Through Passive Analysis of Recursive DNS Traces" (2009) ACSAC, Honolulu, Hawaii, USA (10 pages).
Perdisci et al. "Misleading Worm Signature Generators Using Deliberate Noise Injection" (2006) IEEE Symposium on Security and Privacy (15 pages).
Perdisci et al. "Using an Ensemble of One-Class SVM Classifiers to Harden Payload-Based Anomaly Detection Systems" (Dec. 2006) 6th International Conference on Data Mining (ICDM'06), pp. 488-498.
Perigaud "New Pill?" (Mar. 21, 2008) http://cert.lexsi.com/weblog/index.php/2008/03/21/223-new-pill, pp. 1-3.

(56) References Cited

OTHER PUBLICATIONS

Platt "Probablistic Outputs for Support Vector Machines and Comparisons to Regularized Likelihood Methods" (Mar. 26, 1999) *Advances in Large Margin Classifiers* 10(3):61-74.

Plonka et al. "Context-Aware Clustering of DNS Query Traffic" (2008) 8$^{th}$ IMC, pp. 1-13.

Pointer "Eggdrop Development" (Oct. 1, 2005) http://www.eggheads.org, pp. 1-2.

Porras "Inside Risks: Reflections on Conficker" (Oct. 2009) *Communications of the ACM* 52(10):23-24.

Porras et al. "SRI International Technical Report: Conficker C Analysis" (Apr. 4, 2009) http://mtc.sri.com/Conficker/addendumC, pp. 1-24.

Porras et al. "SRI International Technical Report: An Analysis of Conficker's Logic and Rendezvous Points" (Mar. 19, 2009) http://mtc.sri.com/Conficker, (31 pages).

Provos "CITI Technical Report 03-1: A Virtual Honeypot Framework" (Oct. 21, 2003) http://www.citi.umich.edu/techreports/reports/citi-tr-03-1.pdf, pp. 1-12.

Provos et al. "Virtual Honeypots: Form Botnet Tracking to Intrusion Detection" (2007) Addison-Wesley Professional (TOC).

Ptacek "Side-Channel Detection Attacks Against Unauthorized Hyervisors" (Aug. 20, 2007) http://www.matasano.com/log/930/side-channel-detection-attacks-against-unauthorized-hypevisors, retrieved from Internet Archive on May 23, 2013, pp. 1-12.

Puri "Bots & Botnet: An Overview" (Aug. 8, 2003) SANS Institute 2003 http://222.giac.com/practical/GSEC/Ramneek_Puri_GSEC.pdf, pp. 1-16.

Qian et al. "On Network-Level Clusters for Spam Detection" (2010) USENIX NDSS Symposium, pp. 1-17.

Qin et al. "Worm Detection Using Local Networks" (Feb. 2004) Technical Report GIT-CC-04-04, College of Computing, Georgia Institute of Technology, pp. 1-18.

Quist "Covert Debugging Circumventing Software Armoring Techniques" (2007) Black Hat USA, pp. 1-5.

R Developmental Core Team "R: A Language and Environment for Statistical Computing" (2008) R. Foundation for Statistical Computing, Vienna, Austria.

Racine "Master's Thesis: Analysis for Internet Relay Chat Usage by DDoS Zombies" (Nov. 3, 2003) ftp://www.tik.ee.ethz.ch/pub/students/2003-2004-Wi/MA-2004-01.pdf, pp. 1-4.

Raffetseder et al. "Detecting System Emulators" (2007) ISC, pp. 1-18.

Rajab et al. "A Multifaceted Approach to Understanding the Botnet Phenomenon" (Oct. 25-27, 2006) ACM SIGCOMM/USENIX Internet Measurement Conference (ICM'06), 12 pages.

Rajab et al. "On the Effectiveness of Distributed Worm Monitoring" (2005) 14$^{th}$ USENIX Security Symposium, pp. 1-13.

Ramachandran et al. "Understanding the Network-Level Behavior of Spammers" (Sep. 11-16, 2006) 2006 Conference on Applications, Technologies, Architectures, and Protocols for Computer Communications (SIGCOMM'06), Pisa, Italy, pp. 291-302.

Rieck et al. "Learning and Classification of Malware Behavior" (2008) DIMVA 2008, LNCS 5137, pp. 108-125.

Roberts "Trend Micro Launches Anti-Botnet Service" (Sep. 25, 2006) InfoWorld http://www.infoworld.com/article/06/09/25/HNtrendintercloud_1.html, pp. 1-4.

Roesch "SNORT—Lightweight Intrusion Detection for Networks" (Nov. 7-12, 1999) 13$^{th}$ System Administration Conference (LISA'99), pp. 229-238.

Royal "Alternative Medicine: The Malware Analyst's Blue Pill" (2008) www.damballa.com/downloads/r_pubs/KrakenWhitepaper.pdf (3 pages).

Royal "Alternative Medicine: The Malware Analyst's Blue Pill" (Aug. 6, 2008) Black Hat USA, pp. 1-33.

Royal "Analysis of the Kracken Botnet" (Apr. 9, 2008) (13 pages).

Royal et al. "PolyUnpack: Automating the Hidden-Code Extraction of Unpack-Executing Malware" (2006) Annual Computer Security Applications Conference (ACSAC), pp. 289-300.

RSA Fraudaction Research Labs, "Anatomy of an Attack" (Apr. 1, 2011) http://blogs.rsa.com/fivner/anatomy-of-an-attack, pp. 1-17.

Russinovich et al. "FileMon for Windows V7.04" (Nov. 1, 2006) http://technet.microsoft.com/en-us/sysinternals/bb896642.aspx, (6 pages).

Russinovich et al. "RegMon for Windows V7.04" (Nov. 1, 2006) http://technet.microsoft.com/en-us-sysinternals/bb896652.apsx. (4 pages).

Rutkowska "Introducing Blue Pill" (Jun. 22, 2006) http://theinvisiblethings.blogspot.com/2006/06/introducing-blue-pill.html, pp. 1-26.

Sato et al. "Extending Black Domain Name List by Using Co-Occurrence Relation Between DNS Queries" (2010) The Third USENIX LEET Workshop, pp. 1-22.

Saydjari "Privacy-Enabled Global Threat Monitoring" (2006) IEEE Security & Privacy, pp. 60-63.

Schechter et al. "Access for Sale: A New Class of Worm" (Oct. 27, 2003) ACM Workshop on Rapid Malcode (WORM '03), ACM SIGSAC, Washington, DC, USA, pp. 1-5.

Shannon et al, "The Spread of the Witty Worm" (Mar. 19, 2004) http://www.caida.org/analysis/security/witty/index.xml, pp. 1-7.

Sharif "Mechanisms of Dynamic Analysis and DSTRACE" pp. 1-10.

Shevchenko "Domain Name Generator for Murofet" (Oct. 14, 2010) http://blog.threatexpert.com/2010/10/domain-name-generator-for-murofet.html, pp. 1-4.

Shevchenko "Srizbi's Domain Calculator" (Nov. 28, 2008) http://blog.threatexpert.com/2008/11/srizbix-domain-calculator.html (3 pages).

SIE ISC "ISC—Internet Systems Consortium" (retrieved from Internet Archive on May 23, 2013, Archived Dec. 29, 2008) https://sie.isc.org, pp. 1-2.

Sieberg "Expert: Botnets No. 1 Emerging Internet Threat" (Jan. 31, 2006), CNN.com, CNN Technology News, http://www.cnn.com/2006/TECH/internet/01/31/furst/index.html, pp. 1-4.

Siliconrealms "Silicon Realms Toolworks" (retrieved from Internet Archive on May 23, 2013, Archived Sep. 4, 2006) http://www.siliconrealms.com, pp. 1-12.

Singh "IRC Reconnaissance" (Jul. 24, 2006) (IRCRecon) Public IRC Heuristics (BotSniffer), pp. 1-3.

Singh et al. "Automated Worm Fingerprinting" (Dec. 2004) ACM/USENIX Symposium System Design and Implementation (16 pages).

Sinha et al. "Shades of Grey: On the Effectiveness of Reputation-Based Blacklists" (2008) 3$^{rd}$ International Conference on Malware , pp. 1-8.

Sipser "Introduction to the Theory of Computation" (1996) International Thomson Publishing, Boston, MA.

Sirainen "IRSSI" (updated May 8, 2013) http://en.wikipedia.org/wiki/Irssi, pp. 1-3.

Smith "Dynamic DNS" (Aug. 7, 2006), providers list, http://www.technopagan.org/dynamic, pp. 1-24.

Sommer et al. "Enhancing Byte-Level Network Intrusion Detection Signatures with Context" (Oct. 27-30, 2003) 10$^{th}$ ACM Conference on Computer and Communications Security CCS'03), pp. 262-271.

Sophos "W32/IRCBot-TO" (published Nov. 10, 2010) http://www.sophos.com/virusinfo/analyses.w32ircbotto.html, pp. 1-2.

Souders "Sharding Dominant Domains" (May 12, 2009) http://www.stevesouders.com/blog/2009/05/12/sharding-dominant-domains, pp. 1-3.

Soumenkov et al. "TDL4—Top Bot" (Jun. 27, 2011) http://www.secuirlist.com/en/analysis/204792180/td14_top_bot pp. 1-18.

Spamhaus (2013), http://www.spamhaus.org/sbl, retrieved from Internet Archive on May.23, 2013, Archived Sep. 24, 2006 (24 pages).

Spamhaus (2016), http://www.spamhaus.org/zen/, retrieved from Internet Archive on Mar. 16, 2016, Archived Jul. 6, 2010 (3 pages).

Spitzner "Honeypots: Tracking Hackers" (2003) Addison-Wesley, pp. vii-xiv, 73-139, 141-166, and 229-276.

Staniford "Code Red Analysis Pages: July Infestation Analysis" (Nov. 18, 2001) http://silicondefense.org/cr/july.html, pp. 1-8.

(56) References Cited

OTHER PUBLICATIONS

Staniford "How to Own the Internet in Your Spare Time" (Aug. 2002) 11th USENIX Security Symposium, San Francisco, CA (19 pages).
Staniford et al. "Practical Automated Detection of Stealthy Portscans" (2002) *Journal of Computer Security* 10:105-136.
Staniford-Chen et al. "GrIDS—A Graph Based Intrusion Detection System for Large Networks" (1996) 19th National Information Systems Security Conference, pp. 361-370.
Stewart "Akak Trojan Analysis" (Aug. 31, 2004) http://www.secureworks.com/research/threats/akak, pp. 1-2.
Stewart "Bobax Trojan Analysis" (May 17, 2004) http://www.lurhq.com/bobax.html, pp. 1-2.
Stewart "Dipnet/Oddbob Worm Analysis" (Jan. 13, 2005) SecureWorks, http://www.secureworks.com/research/threats/dipnet, pp. 1-2.
Stewart "I-Worm Baba Analysis" (Oct. 22, 2004) http://secureworks.com/research/threats/baba, pp. 1-7.
Stewart "Phatbot Trojan Analysis" (Mar. 15, 2004) http://www.secureworks.com/research/threats/phatbot, pp. 1-3.
Stewart "Sinit P2P Trojan Analysis" (Dec. 8, 2003) http://www.secureworks.com/research/threats/sinit, pp. 1-4.
Stewart "Top Spam Botnets Exposed" (Apr. 8, 2008) http://www.secureworks.com/cyber-threat-intelligence/threats/topbotnets, pp. 1-11.
Stone-Gross et al. "Pushdo Downloader Variant Generating Fake HTTP Requests" (Aug. 31, 2012) http://www.secureworks.com/cyber-threat-intelligence/threats/Pushdo_Downloader_Variant_Generating_Fake_HTTP_Requests, pp. 1-4.
Stone-Gross et al. "Your Botnet is My Botnet: Analysis of a Botnet Takeover" (Nov. 9-13 2009) CCS'09 (13 pages).
Stover et al. "Analysis of the Storm and Nugache Trojans: P2P is here" (Dec. 2007) Login, vol. 32, No. 6, pp. 18-27.
Sullivan "Fighting Spam by Finding and Listing Exploitable Servers" (2006) Apricot, pp. 1-26.
Swatt It "Bots, Drones, Zombies, Worms and Other Things That Go Bump in the Night" (2004) http://swatit.org/bots, pp. 1-6.
Symantec "Symantec Internet Security Threat Report" (Sep. 2004) Cupertino, CA, VI:1-57.
Symantec Global "Symantec Global Internet Security Threat Report: Trends for 2008" (Apr. 2009) Cupertino, CA, XIV:1-110.
Szor, "The Art of Computer Virus Research and Defense" (Feb. 2005) Addison-Wesley Professional (TOC).
Team Cymru "Developing Botnets" (2010) http://www.team-cymru.com/ReadingRoom/Whitepapers/2010/developing-botnets.pdf, pp. 1-3.
Team Cymru "IP to ASN Mapping" (Mar. 23, 2013) http://www.team-cymru.org/Services/ip-to-asn.html, (6 pages).
Templeton et al. "A Requires/Provides for Computer Attacks" (2000) 2000 Workshop on New Security Paradigms (NSPW'00), pp. 31-38.
Temu "Bitzblaze: Binary Analysis for COTS Protection and Malicious Code Defense" (printed May 23, 2013) http://bitblaze.cs.berkeley.edu/temu.html, pp. 1-4.
Thimbleby et al. "A Framework for Modeling Trojans and Computer Virus Infection" (1999) *Computer Journal* 41(7):444-458.
Threat Encyclopedia "Virus:Win32/Expiro.Z" (Jun. 9, 2011) http://www.microsoft.com/security/portal/Threat/Encyclopedia/Entry.aspx, pp. 1-5.
Threatfire "Threatfire protects when your antivirus can't" (retrieved from Internet Archive on May 23, 2013) http://www.threatfire.com, pp. 1-18.
Trendmicro "2006 Press Releases: Trend Micro Takes Unprecedented Approach to Eliminating Botnet Threats with the Unveiling of InterCloud Security Service" (Sep. 25, 2006) http://www.trendmicro.com/en/about/news/pr/archive/2006/pr092506.htm, pp. 1-2.
Trendmicro "InterCloud Security Service", http:/www.trendmicro.com/en/products/nss/icss/evaluate/overeiw.thm, pp. 1-2.
Trendmicro website (retrieved Oct. 2013) http://www.trendmicro.com/en/home/us/home.htm.
Uhlig et al. "Intel Virtualization Technology" (May 2005) *Computer* 38(5):48-56.
Urbanek "RJava: Low-Level-R to Java Interface" (May 6, 2013) pp. 1-5.
Uribl, http://www.uribl.com/about.shtml, retrieved from Internet Archive on Mar. 16, 2016, Archived Jul. 22, 2010, pp. 1-4.
Valdes et al. "Probabilistic Alert Correlation" (2001) Recent Attack in Intrusion Detection, LNCS 2212:54-68.
Valeur et al. "A Comprehensive Approach to Intrusion Detection Alert Correlation" (Jul. 2004) IEEE Transactions on Dependable and Secure Computing 1(3):146-169.
Vasudevan et al. "Cobra: Fine-Grained Malware Analysis Using Stealth Localized-Executions" (2006) IEEE Symposium on Security and Privacy (S&P'06), pp. 264-279.
Vasudevan et al. "Stealth Breakpoints" (2005) 21st Annual Computer Security Applications Conference (ACSAC), pp. 381-392.
Vigna et al. "NetSTAT: A Network-Based Intrusion Detection Approach" (Dec. 7-11, 1998) 14th Annual Computer Security Applications Conference (ACSAC '98), pp. 25-34.
Viruses "Troj/Agobot-IB" (printed Jun. 27, 2012) http://www.sophos.com/virusinfo/analyses/trojagobotib.html (1 page).
Vixie "DNS Complexity" (Apr. 24, 2007) *ACM Queue* pp. 24-29.
Vixie "What DNS is Not" (Dec. 2009) *Communications of the ACM* 52(12):43-47.
Vixie et al. "RFC 2136: Dynamic Updates in the Domain Name System (DNS Update)" (Apr. 1997) http://www.faqs.org/rfcs.rfc2136.html, pp. 1-25.
Vmware "Vmware Server" (retrieved from Internet Archive on May 23, 2013, Archived Sep. 26, 2006) http://www.vmware.com, pp. 1-32.
Wang et al. "Anagram: A Content Anomaly Detector Resistant to Mimicry Attack" (2006) International Symposium on Recent Advances in Intrusion Detection (RAID), pp. 1-20.
Wang et al. "Anomalous Payload-Based Network Intrusion Detection" (2004) 7th International Symposium on Recent Advances in Intrusion Detection (RAID 2004) (20 pages).
Wang et al. "Anomalous Payload-Based Worm Detection and Signature Generation" (2005) International Symposium on Recent Advances in Intrusion Detection (RAID) (20 pages).
Wang et al. "Automated Web Patrol with Strider HoneyMonkeys: Finding Web Sites That Exploit Browser Vulnerabilities" (2006) NDSS'06, pp. 1-15.
Wang et al. "Modeling the Effects of Timing Parameters on Virus Propagation" (Oct. 27, 2003) ACM CCS Workshop on Rapid Malcode (WORM '03), Washington, DC, pp. 61-66.
Wang et al. "The Dilemma of Covert Channels Searching" (2006) ICISC 2005, LNCS 3935, pp. 169-174.
Weaver et al. "A Taxonomy of Computer Worms" (Oct. 27, 2003) WORM'03, pp. 11-18.
Weaver et al. "Redirecting DNS for ADS and Profit" (Aug. 2011) USENIX Workshop on Free and Open Communications on the Internet (FOCI), pp. 1-6.
Weaver et al. "Very Fast Containment of Scanning Worms" (Aug. 9-13, 2004) 13th USENIX Security Symposium, pp. 29-44.
Weimer "Passive DNS Replication" (2005) http://www.enyo.de/fw/software/dnslogger, pp. 1-6.
Weimer "Passive DNS Replication" (Apr. 2005) 17th Annual FIRST Conference on Computer Security Incident (13 pages).
Welch et al. "Strike Back: Offensive Actions in Information Warfare" (1999) AMC New Security Paradigm Workshop, pp. 47-52.
Wessels et al. "Measurements and Laboratory Simulations of the Upper DNS Hierarchy" (2005) PAM, pp. 1-10.
Whyte "Exposure Maps: Removing Reliance on Attribution During Scan Detection" (2006) 1st USENIX Workshop on Hot Topics in Security, pp. 51-55.
Whyte et al. "DNS-Based Detection of Scanning Worms in an Enterprise Network" (Feb. 3-4, 2005) 12th Annual Network and Distributed System Security Symposium, pp. 181-195.
Wikipedia Definition "Storm Botnet", printed Jan. 29, 2013) http://en.wikipedia.org/wiki/Storm_botnet, pp. 1-7.

(56) References Cited

OTHER PUBLICATIONS

Wikipedia Definition "Windows Virtual PC", http://en.wikipedia.org/wiki/Windows_Virtual_PC, Last Modified May 5, 2013, pp. 1-21.

Willems et al. "Toward Automated Dynamic Malware Analysis Using CWSandbox" (2007) IEEE Security and Privacy, 5(2):32-39.

Williams "What We Know (and Learn) for the Waledac Takedown" (Mar. 15, 2010) http://blogs.technet.com/b/mmpc/archive/2010/03/15/what-we-know-and-learned-form-the-waledac-takedown-aspx, pp. 1-3.

Williamson et al. "Virus Throttling for Instant Messaging" (Sep. 2004) Virus Bulletin Conference, Chicago, IL, USA, pp. 1-13.

Wolf "Technical Details of Srizbi's Domain Generation Algorithm" (Nov. 25, 2008) http://blog.fireeye.com/research/2008/11/technical-details-of-srizbis-domain-generation-algorithm.html, pp. 1-9.

Wu et al. "AGREP—A Fast Approximate Pattern-Matching Tool" (1992) USENIX Technical Conference (10 pages).

Wu et al. "An Effective Architecture and Algorithm for Detecting Worms with Various Scan Techniques" (Feb. 2004) 11th Annual Network and Distributed System Security Symposium (NDSS '04), pp. 1-14.

Wurzinger et al. "Automatically Generating Models for Botnet Detection" (2009) 14th European Conference on Research in Computer Security (ESORICS'09), pp. 232-249.

Xie et al. "Spamming Botnet: Signatures and Characteristics" (Aug. 17-22, 2008) ACM SIGCOMM 2008 Conference on Data Communications (SIGCOMM'08), pp. 171-182.

Yadav et al. "Detecting Algorithmically Generated Malicious Domain Names" (Nov. 1-3, 2010) 10th Annual Conference of Internet Measurement (IMC'10), pp. 48-61.

Yang et al. "CARDS: A Distributed System for Detecting Coordinated Attacks" (2000) Sec, pp. 1-10.

Yegneswaran et al. "An Architecture for Generating Semantics-Aware Signatures" (2005) USENIX Security Symposium (16 pages).

Yegneswaran et al. "Global Intrusion Detection in the DOMINO Overlay System" (Feb. 2004) Network and Distributed Security Symposium (NDSS) (17 pages).

Yegneswaran et al. "On the Design and Use of Internet Sinks for Network Abuse Monitoring" (2004) RAID 2004, LNCS 3224, pp. 146-165.

Yegneswaran et al. "Using Honeynets for Internet Situational Awareness" (Nov. 2005) Fourth Workshop on Hot Topics in Networks (HotNets IV), pp. 1-6.

Yin et al. "Panorama: Capturing System-Wide Information Flow for Malware Detection and Analysis" (Oct. 29-Nov. 2, 2007) ACM Conference on Computer and Communication Security, pp. 1-13.

Zdrnja et al. "Passive Monitoring of DNS Anomalies" (2007) DIMVA Conference, pp. 1-11.

Zeus Tracker "Welcome to the ZeuS Tracaker" (retrieved from Internet Archive on May 23, 2013, Archived Oct. 26, 2010) https://zeustracker.abuse.ch, pp. 1-37.

Zhang et al. "Detecting Stepping Stones" (Aug. 14-17, 2000) 9th USENIX Security Symposium, Denver, Colorado, USA, pp. 1-15.

Zhang et al. "Highly Predictive Blacklisting" (2008) USENIX Security Symposium, pp. 107-122.

Zhou et al., "Dissecting Android Malware: Characterization and Evolution" (2012) IEEE Symposium on Security and Privacy, pp. 95-109.

Zhu et al. "Using Failure Information Analysis to Detect Enterprise Zombies" (2009) Lecture note of the Institute for Computer Science, Social-Informatics and Telecommunications Engineering 19(4):185-206.

Zou et al. "Code Red Worm Propagation Modeling and Analysis" (Nov. 18, 2002) 9th ACM Conference on Computer and Communications Security (CCS '02), pp. 1-10.

Zou et al. "Email Worm Modeling and Defense" (Oct. 27, 2004) 13th ACM International Conference on Computer and Communications Security (CCS '04) (6 pages).

Zou et al. "Monitoring and Early Warning for Internet Worms" (Oct. 2003) 10th ACM Conference on Computer and Communications Security (CCS'03) (10 pages).

Zou et al. "On the Performance of Internet Worm Scanning Strategies" (Nov. 2003) Technical Report TR-03-CSE-07, Umass ECE Dept. (16 pages).

Zou et al. "Routing Worm: A Fast, Selective Attack Worm Based on IP Address Information" (Jun. 1-3, 2005) Technical Report: TR-03-CSE-06, Principles of Advanced and Distributed Simulation (PADS) pp. 199-206.

Zou et al. "Worm Propagation Modeling and Analysis Under Dynamic Quarantine Defense" (Oct. 27, 2003) WORM'03, Washington, DC USA (10 pages).

Kristoff, "Botnets, Detection and Mitigation: DNS-Based Techniques," NU Security Day (2005) 23 pages, www.it.northwesterd.edu/bin/docs/bots_Kristoff_jul05.ppt.

"Spamming Botnets: Signatures and Characteristics" Xie et al; ACM SIGCOMM. Settle. WA; Aug. 2008; 12 pages (Year: 2008).

* cited by examiner

SYSTEMS AND METHODS FOR TRAFFIC CLASSIFICATION

CROSS-REFERENCE TO RELATED APPLICATIONS

This application claim the benefit of U.S. Provisional Patent Application No. 61/835,358, filed Jun. 14, 2014, which is incorporated by reference in its entirety as if fully set forth herein.

DETAILED DESCRIPTION OF SEVERAL EMBODIMENTS

Figure 1:
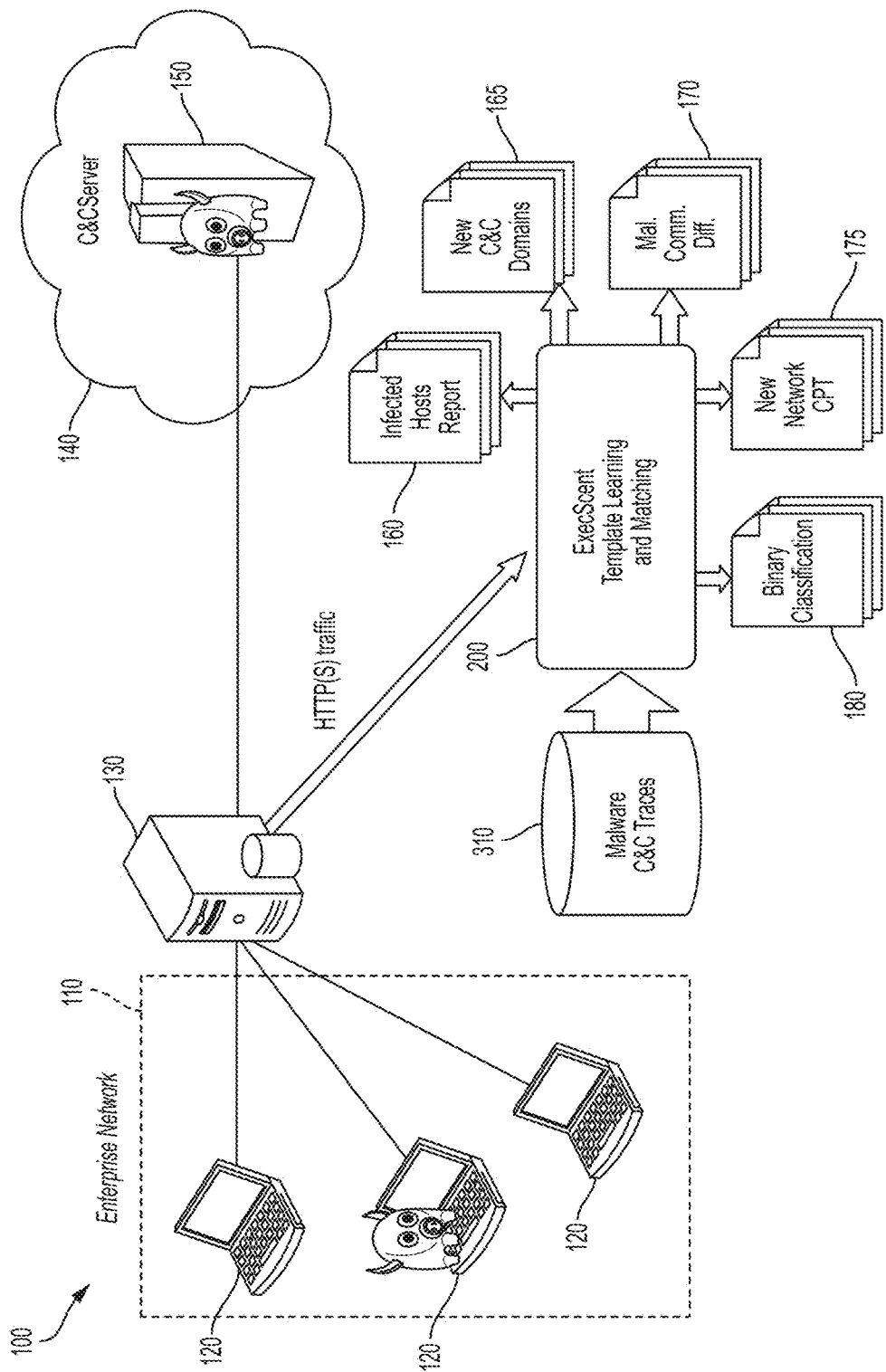
FIG. 1 is a network according to an embodiment of the invention.

Malware, such as botnets, may include at least two fundamental components: a client agent, which may run on victim machines, and a control server application, which may be administered by the malware owner. Both components may employ code reuse, wherein new (polymorphic) malware releases may be created by simply re-packaging previous samples, or by augmenting previous versions with a few new functionalities. Moreover, it is not uncommon for the source code of successful malware to be sold or leaked on underground forums, and to be reused by other malware operators. Code reuse may result in many different malware samples sharing a common command-and-control (C&C) protocol, although control server instances owned by different malware operators may run on different C&C domains and IPs. A C&C protocol may be the set of specifications implemented to enable the malware control application logic, which is defined at a higher level of abstraction compared to the underlying transport (e.g., TCP or UDP) or application (e.g., HTTP) protocols that facilitate the C&C communications.

Systems and methods described herein may mine new, previously unknown C&C domain names from live enterprise network traffic. Starting from a seed list of known C&C communications and related domain names found in malware-generated network traces, new C&C domains may be discovered by taking advantage of the commonalties in the C&C protocol shared by different malware samples. Unique traits of a given C&C protocol may be automatically learned from the seed of known C&C communications to derive a control protocol template (CPT), which may in turn be deployed at the edge of a network to detect traffic destined for new C&C domains. For example, a seed of known C&C traffic used to learn the control protocol templates may be generated by leveraging blacklists of known C&C domain names. Adaptive templates that learn from the traffic profile of the network where the templates are to be deployed may also be built. Hybrid templates that can self-tune to each specific deployment scenario may be generated, which may be done to prevent excessive false positives. The templates may model the entire content of HTTP requests, rather than being limited to the URL string. The systems and methods described herein may detect C&C communications initiated by single malware infected machines with low false positive and high true positive rates, and may attribute the discovered new C&C domains to a known malware family name or malware operator (e.g., the name of the cybercriminal group behind the malware operation). Discovered C&C domain names may also be deployed in existing lightweight malware detection systems based on DNS traffic inspection, thus contributing to the detection and attribution of malware infections in very large networks (e.g., ISP networks) where monitoring all traffic may not be practically feasible.

Systems and methods described herein may comprise one or more computers. A computer may be any programmable machine or machines capable of performing arithmetic and/or logical operations. In some embodiments, computers may comprise circuits, integrated circuits, processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "router" may appear in the following specification, the disclosed embodiments are not limited to routers.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data can be the basis of a network.

FIG. 1 is a network 100 according to an embodiment of the invention. In this example, the network 100 may include an enterprise network 110 (e.g., a local area network) wherein one or more computers 120 may communicate with one another and/or an external public network such as the Internet 140. The computers 120 may be in communication with a server 130 through which Internet traffic and/or other traffic to and from portions of the network 100 outside the enterprise network 110 may flow (e.g., HTTP(S) traffic, as shown). In some cases, one or more external computers in communication with the server 130 may be C&C servers 150 associated with malware C&C domains. As will be described in greater detail below, a traffic classification system 200 may be part of and/or in communication with the server 130 or other computers 120 of the enterprise network 110. The traffic classification system 200 may receive traffic, which may include malware C&C traces 310, and perform template learning and matching operations. The traffic classification system 200 may generate infected hosts reports 160, identify new C&C domains 165, determine malware communication diffs 170, derive new CPTs 175, and/or perform binary classification 180.

Figure 2A:
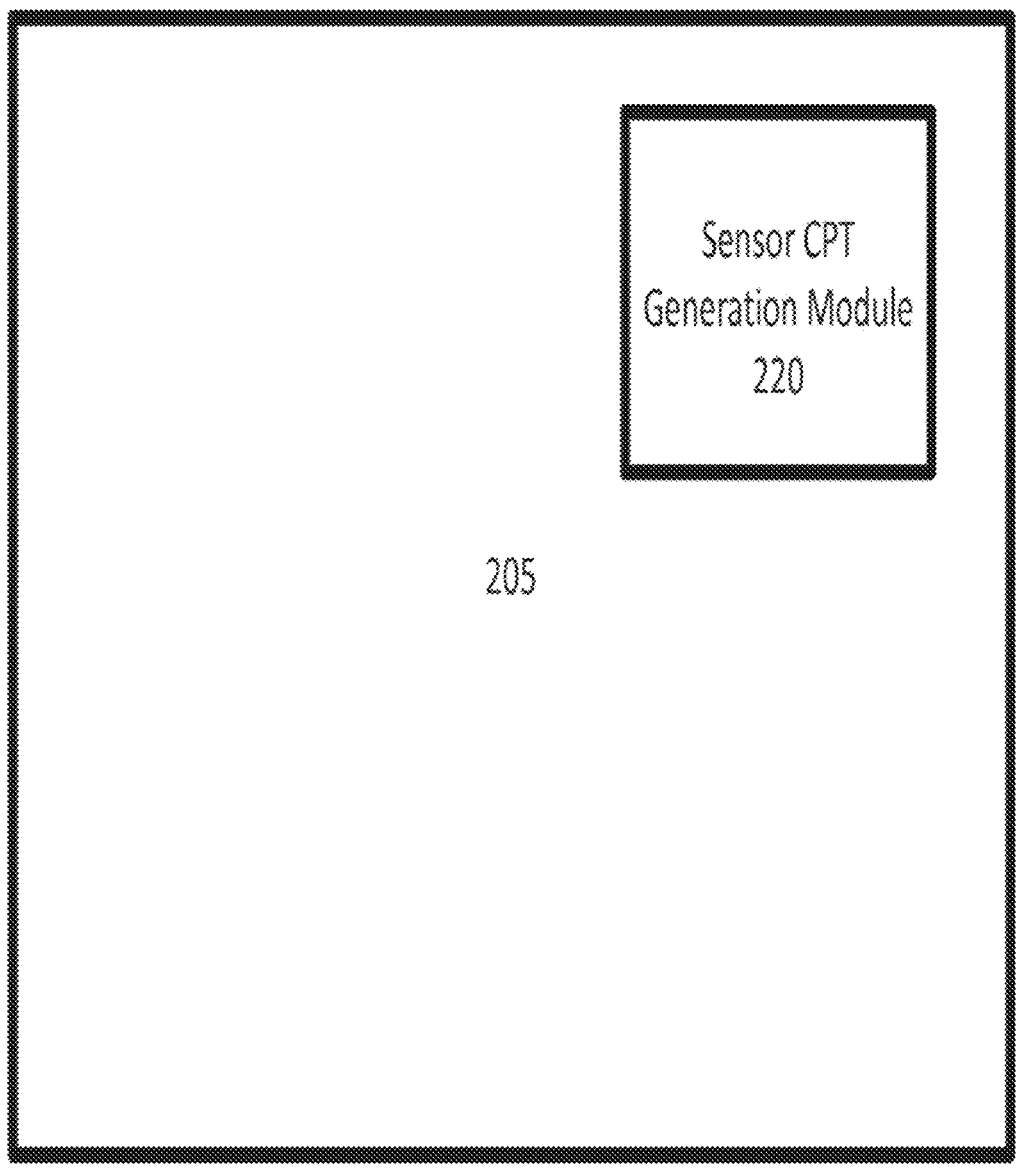
FIG. 2A is a control protocol template (CPT) generation system according to an embodiment of the invention

FIG. 2A is a CPT generation system 205 according to an embodiment of the invention. The CPT generation system 205 may comprise one or more computers and various modules which may perform the tasks described in greater detail below. For example, the traffic classification system 200 may include a sensor CPT generation module 220.

Figure 2B:
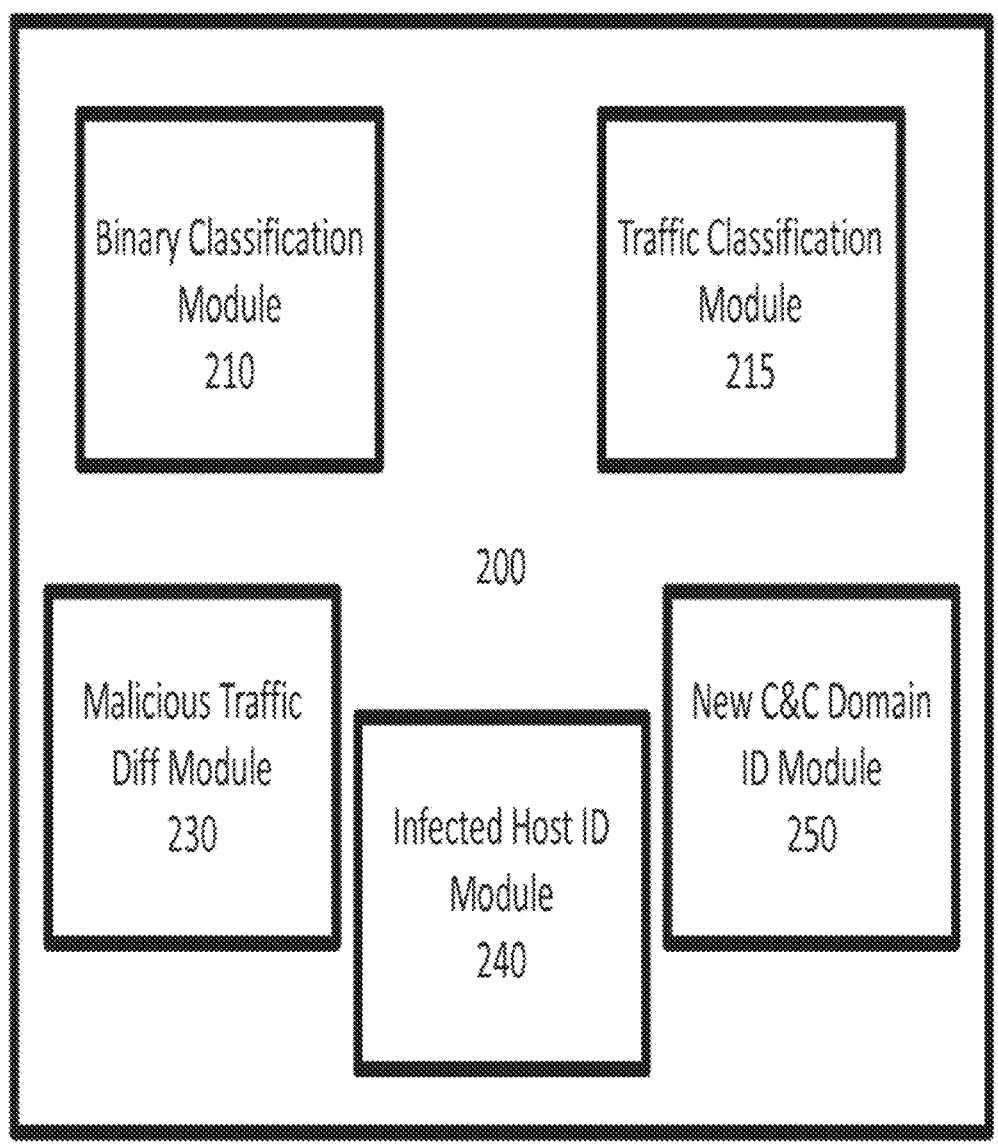
FIG. 2B is a traffic classification system according to an embodiment of the invention.

FIG. 2B is a traffic classification system 200 according to an embodiment of the invention. The traffic classification system 200 may receive CPT data from the CPT generation system 205, for example via a network connection or direct connection. The traffic classification system 200 may comprise one or more computers and various modules which may perform the tasks described in greater detail below. For example, the traffic classification system 200 may include a binary classification module 210, a traffic classification module 215, a malicious traffic difference (diff) module 230, an infected host ID module 240, and/or a new C&C domain ID module 250.

Figure 3:
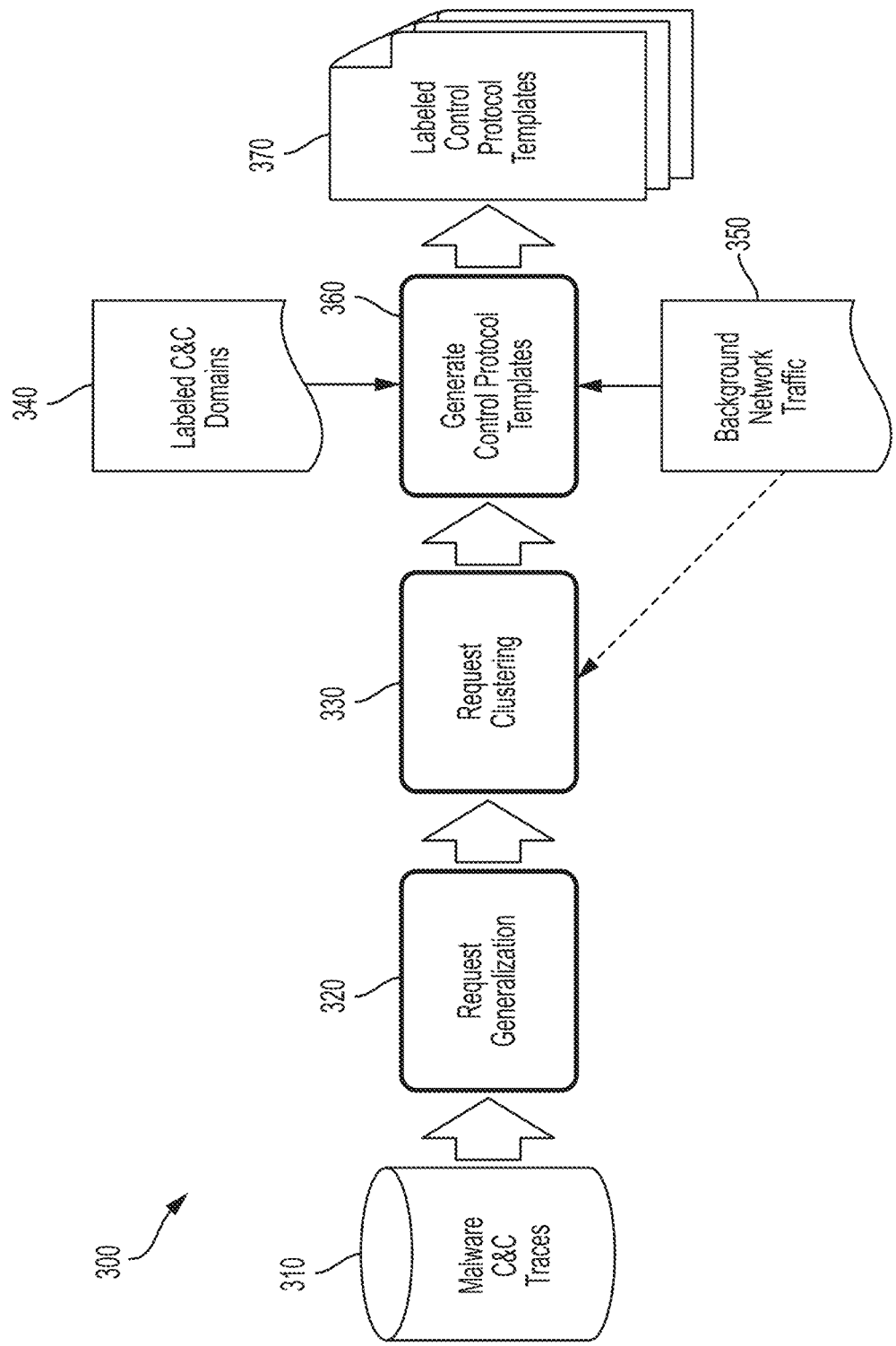
FIG. 3 is a CPT generation process according to an embodiment of the invention.

FIG. 3 is a CPT generation process 300 according to an embodiment of the invention. Given a large repository of malware-generated network traces 310, the CPT generation module 220 may first reconstruct all HTTP requests performed by each malware sample. In 320, the CPT generation module 220 may apply a request generalization process, in which it may replace some of the request parameters (e.g., URL parameter values) with their data type and length. The CPT generation module 220 may consider the entire content of the HTTP requests, not only the URLs, and the generalization process may be applied to different parts of the request header. In 330, the CPT generation module 220 may cluster the generalized requests. Applying the generalization process may improve the accuracy of the request clustering process, in which the CPT generation module 220 may group together malware-generated requests that follow a similar C&C protocol. Once the malware requests have been clustered, in 360 the CPT generation module 220 may apply a template learning process which may derive the CPTs. A CPT may summarize the generalized HTTP requests grouped in a cluster, and may record a number of properties such as the structure of the URLs, the set of request headers, the IP addresses contacted by the malware, etc. Furthermore, in 340 the CPT generation module 220 may use the templates and a database of labeled C&C domains to associate a malware family label to each template, as discussed in greater detail below. Before the templates are deployed in a network, in 350 the CPT generation module 220 may adapt the CPTs to the background traffic observed in that network. For example, for each template component (e.g., the generalized URL path, the user-agent string, the request header set, etc.), the CPT generation module 220 may compute how frequently the component appears in the deployment network. CPT components that are popular in the background traffic may be assigned a lower match confidence for that network. On the other hand, components that appear very infrequently (or not at all) in the traffic may be assigned a higher confidence. These rare components may be defined as components having high specificity with respect to the deployment network's traffic, as discussed in greater detail below. Next, the system 200/205 may deploy the CPT. After deployment, in 370 a HTTP request may be labeled as C&C if it matches a CPT with high similarity and specificity (e.g., if the request closely matches a CPT and the matching CPT components have high specificity (e.g., rarely appear) in that particular deployment network). Note that in some embodiments, some portions of the process 300 may be performed by other modules in addition to and/or in place of the CPT generation module 220, such as, for example the traffic classification module 215.

Figure 4:
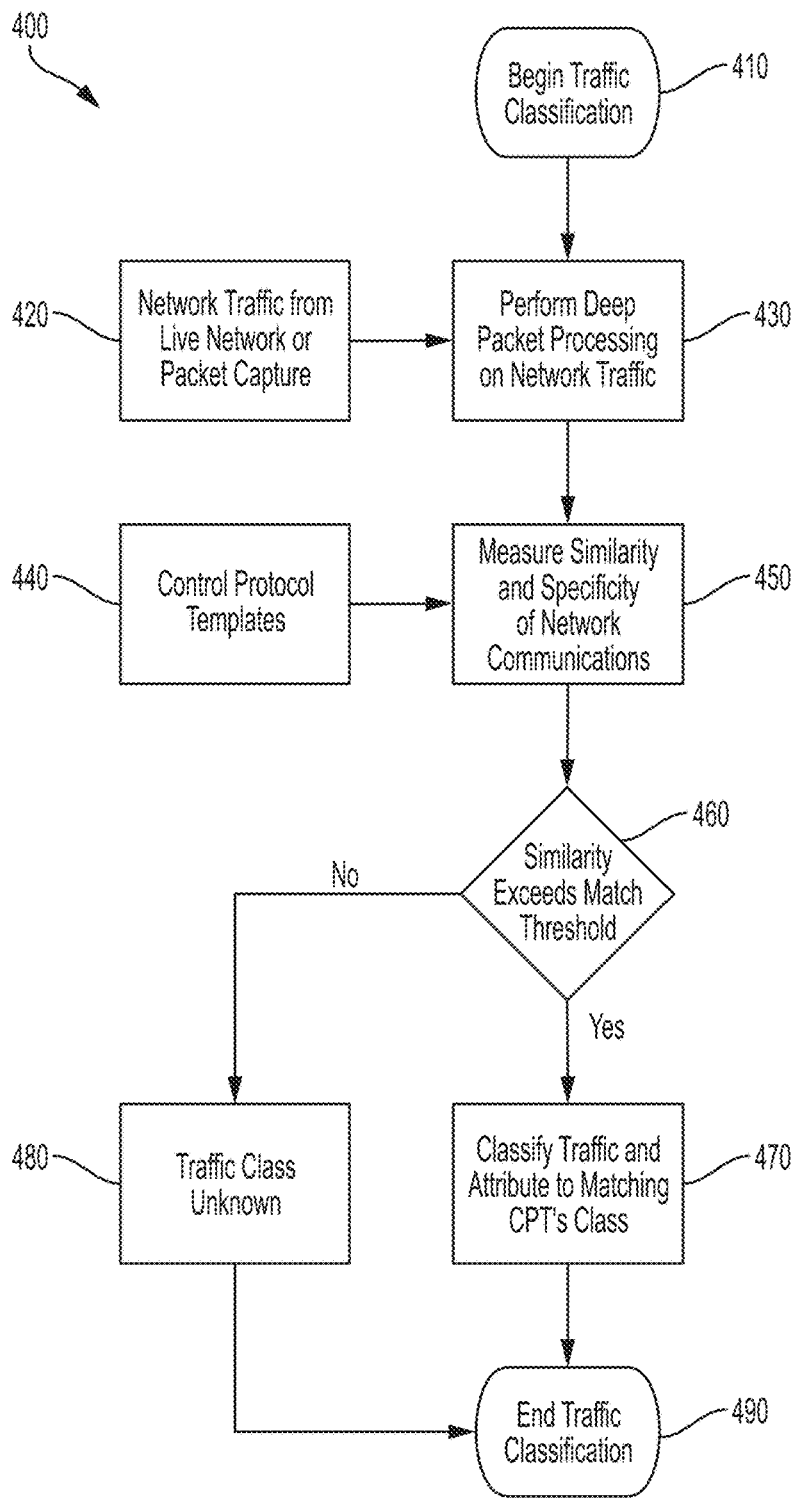
FIG. 4 is a traffic classification process according to an embodiment of the invention.

FIG. 4 is a traffic classification and attribution process 400 according to an embodiment of the invention. In 410, the traffic classification module 215 may begin the classification process 400. Note that this process may be performed after CPTs have been generated. CPT generation is described in greater detail below. In 420, the traffic classification module 215 may receive network traffic from live network monitoring and/or packet capture. In 430, the traffic classification module 215 may perform deep packet processing on the network traffic to determine the properties of the communications for comparison to CPTs. Also note that in some embodiments, deep packet processing may be performed elsewhere, and the results may be used by the traffic classification module 215. In 440, the traffic classification module 215 may receive or access the CPTs. In 450, the traffic classification module 215 may measure the similarity and/or specificity of the monitored and processed network communications in relation to one or more CPTs. The confidence in a match of template in a given network may depend on similarity and/or specificity. Similarity may be defined as a measure of how closely an HTTP request matches an element of the template. Specificity may be defined as a measure of how specific (or rare) are the template components with respect to the network's traffic in general. In 460, the traffic classification module 215 may determine whether the similarity of the traffic exceeds a match threshold for one or more CPTs. If so, in 470 the traffic classification module 215 may classify the traffic and its matching attribute(s) to the matching CPT class(es). If not, in 480 the traffic classification module 215 may determine that the traffic has an unknown class. After classification, in 490 the process 400 may end.

For example, the following hypothetical scenario may illustrate the tailoring of a template to a specific network. Assume a template that matches an HTTP request in both networks NetA and NetB with a similarity score s when compared in 460 as described above. Assume the score s is the same for both NetA's traffic and NetB's traffic. Suppose also that the server's IP (or its /24 prefix) associated with the matching traffic is ipa for NetA and ipb for NetB. Also, suppose that ipa is popular in network NetA, whereas ipb has very low popularity in NetB because it has never been contacted by hosts in that network. Because ipa is very popular in NetA (e.g., more than 50% of the hosts in NetA have contacted the domain in the past), it may be likely that the template is matching benign traffic, thus potentially causing a large number of false positives in NetA. On the other hand, because ipb has very low popularity in NetB, it is more likely that the match is a true detection, or that in any case will generate very few (potentially only one) false positives in NetB. Consequently, as set forth above in 470, based on a model of recent traffic observed in NetA and NetB, confidence for the matches observed in NetA may be lowered, but may not be lowered for NetB. In other words, the system may to NetA to "tune down" the false positives. At the same time, keeping the confidence in high for NetB means that the system may still be able to detect C&C communications that match while keeping the risk of false positives low. This approach may be generalized to all other components of the templates (e.g, the structure of the URLs, the user-agent strings, the other request headers, etc.), in addition to the destination IPs. An HTTP request may be labeled as C&C if it matches a CPT with both high similarity and high specificity. Considering more than just URLs may enable detection of more malware than considering only URLs. For example, some malware (e.g., TDL4) may exchange information with the C&C by first encrypting it, encoding it (e.g., using base-64 encoding), and embedding it in the URL path. In another example, identifier strings may be embedded in fields such as user-agent (e.g., some malware samples use their MD5 hash as user-agent name), encoded in other request headers (e.g., in the referrer), or in the body of POST requests.

Figure 5:
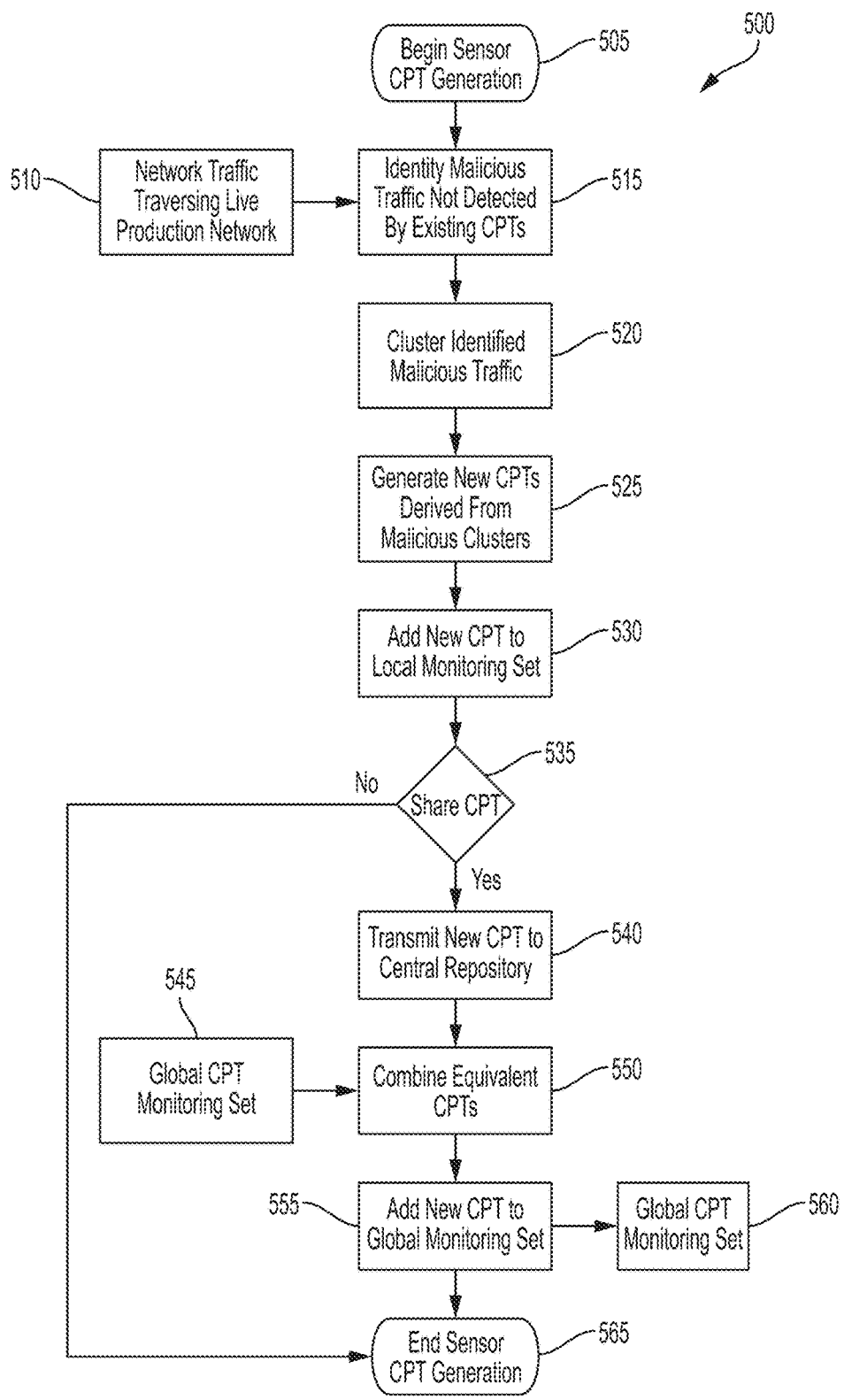
FIG. 5 is a CPT generation process according to an embodiment of the invention.

FIG. 5 is a CPT generation process 500 according to an embodiment of the invention. In 505, the generation process 500 may begin. In 510, the CPT generation module 220 may receive network traffic and in 515 the CPT generation module 220 may identify malicious traffic not detected by existing CPTs, as discussed in greater detail below. In 520, the CPT generation module 220 may cluster identified malicious traffic, and in 525 the CPT generation module 220 may generate new CPTs from the malicious clusters. In 530, the new CPTs may be added to a local monitoring set of CPTs. In 535, a decision may be made to share the new CPTs with other systems 200. If they are not to be shared, in 565 the process may end. If sharing is to be performed, in 540 the CPT generation module 220 may transmit the new CPT to a central repository. In 545, the central repository may retrieve a global CPT monitoring set, and in 550 the new CPT may be combined to an existing CPT if it is equivalent. If there is no existing equivalent CPT, in 555 the new CPT may be added to the new monitoring set, and in 550 the new set may be stored. Then in 565 the process may end. Note that in some embodiments, some portions of the process 500 may be performed by other modules in addition to and/or in place of the CPT generation module 220, for example the traffic classification module 215.

The following is a detailed example of a CPT generation process 500. To obtain CPTs, similar C&C requests may be grouped together. To this end, an appropriate similarity metric may be defined before clustering algorithms can be applied in 520. The system may use a set of heuristics to detect strings that represent data of a certain type, and may replace them accordingly using a placeholder tag containing the data type and string length. For example, "fa45e" may be identified as lowercase hexadecimal because it contains numeric characters and the alphabetic characters are all valid lowercase hexadecimal digits. Example data types which may be identified include integer, hexadecimal (upper, lower and mixed case), base64 (standard and URL safe), and string (upper, lower and mixed case). In addition, for integer, hexadecimal, and string, the system may identify the data type plus additional punctuation such as ":" or "." (e.g., 192.168.1.1 may be identified as a data type of integer+period of length 11). Furthermore, the system may be extended to support data types such as IP address, MAC address, MD5 hash, and version number.

Similar C&C requests may be grouped together before extracting the templates, as set forth above in 520. This clustering step may assist the automatic CPT generation algorithm, improving efficiency and yielding templates that may be generic enough to match similar C&C communications in new traffic, and precise enough to generate very few or no false positives. C&C request clustering may be performed in two phases. During the first phase, C&C requests may be grouped based on their destination IPs. For example, two C&C requests may be grouped together if their destination IPs reside in /24 (or class C) networks that share a DNS-based relationship. In this example, two /24 networks may be related if there exists at least one domain name which resolved to different IP addresses residing in the two different networks. To find such relationships, a large passive DNS database may be used. In the second phase, one coarse-grained cluster at a time may be evaluated, and a cluster's C&C requests may be finely grouped according to a content similarity function. An agglomerative hierarchical clustering algorithm may be used group together C&C requests within a coarse-grained cluster that carry similar generalized URLs, similar user-agent strings, similar numbers of HTTP header fields and respective values, etc. When measuring the similarity between two requests, both the similarity and specificity of the requests' content may be considered, where the specificity (or low "popularity") may be measured with respect to a dataset of traffic recently collected from different networks.

Once C&C requests have been clustered, a CPT may be generated from each cluster, as set forth above in 525. At this stage, only clusters that contain at least one HTTP request to a known C&C domain may be considered. Each template may represent a summary of all C&C requests in a cluster, and may contain the following components:

Median URL path: median path string that minimizes the sum of edit distances from all URL paths in the requests.

URL query component: stores the set of parameter names and value types and lengths observed in the query component of each of the URLs.

User-agent: the set of all different (generalized) user agent strings found in the requests.

Other headers: the set of other HTTP headers observed in the requests and responses. For each header, the length and value string may also be stored.

Dst. networks: the set of all destination /24 networks associated with the C&C requests in the cluster.

Request Content: the set of data-types, encodings and lengths for the content found in the requests.

Response Content: the set of data-types, encodings and lengths for the content found in the responses.

Malware family: the (set of) malware family name(s) associated to the known C&C requests in the cluster.

In addition, each CPT may include the following deployment related information:

URL regex: to increase the efficiency of the template matching phase, each template includes a regular expression automatically generated from the set of URL strings in the requests. The URL regex may be built to be fairly generic, and is used during deployment to filter out traffic that is unlikely to closely match the entire template, thus reducing the cost of computing the similarity between HTTP requests in live traffic and the template.

Background traffic profile: information derived from the traffic observed in the deployment environment within the past W days (where W is a system parameter). This is used for computing the specificity of the CPT components, thus allowing to adapt the CPT to the deployment network.

Once the CPTs are deployed, the traffic classification process 400 may label an HTTP request as C&C if it matches a CPT with both high similarity and specificity, as set forth above in 450. To this end, a specificity score may be computed for each element of a component, which indicates how "unpopular" that element is with respect to the traffic profile in the deployment network. Computing URL specificity may rely on a supervised classification approach. For example, given a dataset of traffic collected from a large network, all URLs may be extracted. A map of URL word frequencies may be generated, where the "words" are extracted by tokenizing the URLs (e.g., extracting elements of the URL path, filename, query string, etc.). Then, if there is a new URL, it may be translated into a feature vector in which the statistical features measure things such as the average frequency of single "words" in the tokenized URL, the average frequency of word bigrams, the average frequency of the query parameters, the frequency of the file name, etc. (to extract the frequency values for each word found in the URL, previously learned maps of word frequencies may be looked up).

After a large set of "background traffic URLs" has been translated into feature vectors, an SVM classifier that can label new URLs as either popular or unpopular may be trained. First, the "background URLs" may be ranked according to their domain based popularity (i.e., URLs that appear on requests to multiple sites on different domain names may be considered more popular). Then, a sample of URLs may be obtained from the top and from the bottom of this ranking, which may be labeled as popular and unpopular, respectively. This labeled dataset may be used to train the SVM classifier, and the max margin approach used by the SVM may produce a model that can generalize to URLs not seen during training. The trained classifier may then be used in the traffic classification process 400 (e.g., to measure specificity in 450).

During the operational phase (once the SVM classifier is trained and deployed), a URL may be translated into its corresponding feature vector, which may be fed to the SVM classifier. The classifier can then label the URL as either popular or unpopular. In some embodiments, only the classification score (or confidence) associated with the popular class may be considered. Therefore, the SVM's output can be interpreted as follows: the higher the score, the more the URL "looks like" a popular URL, when compared to the large set of URLs observed in the background traffic. Finally a specificity score for the URL may be computed.

Template matching, as set forth in 450, may be performed in two phases. Each template may contain an URL regular expression automatically derived from the C&C requests in a cluster. An HTTP request may be tested for template matching by comparing its URL to the template's URL regex. As noted above, the URL regex may be intentionally built to be fairly generic, and may be used to efficiently filter out traffic that is very unlikely to match the entire template. Furthermore, the destination IP may be checked to determine whether it resides within any of the /24 prefixes in the template. If neither the URL regex nor the destination IP have a match, the HTTP request may be assumed to not match. Otherwise, the entire content of the request may be considered, including transforming the request according to the request generalization process and measuring the overall matching score between the generalized request and the template.

Similarity between data being analyzed, such as an HTTP request, and a CPT may be determined as follows: To determine if a new HTTP request r matches a CPT, a matching score may be computed using a similarity function that compares each element of a request with its respective counterpart in a template using a dynamic weighting function. The dynamic weighting function may be a function of both the similarity and the specificity of the component of the CPT. For example, given an HTTP request r and a CPT t, a matching score $S(r,t)$ may be determined according to Equation 1: $S(r,t)=(\Sigma_k \omega_k(s_k,\sigma_k)*s_k(r_k,t_k))/(\Sigma_k \omega_k(s_k,\sigma_k))*\sigma_d$, where $s_k$ is a similarity function that compares each element $t_k$ of t with its respective counterpart $r_k$ of r, and where $\omega_k$ is a dynamic weight that is a function of both the similarity $s_k$ and the specificity $\sigma_k$ of the k-th component of t. The denominator may scale $S(r,t)$ between zero and one.

The factor $\sigma_d$ may be the specificity of the destination domain d of request r, which may be computed as $\sigma_d=1-(m_d/(\max_i\{m_{di}\}))$ where $m_d$ is the number of hosts in the deployment network's traffic that queried domain d and $\max_i\{m_{di}\}$ is the number of hosts that queried the most popular domain in the traffic. Accordingly, $\sigma_d$ may be used to decrease the matching score $S(r,t)$ for low-specificity domains (i.e., domains queried by a large number of hosts), because infections of a specific malware family may affect a relatively limited fraction of all hosts in an enterprise network, as modern malware may propagate relatively "slowly" via drive-by downloads or social engineering attacks. In turn, it may be unlikely that a new C&C domain will be queried by a very large fraction (e.g., >50%) of all hosts in the monitored network within a limited amount of time (e.g., one day).

The details of the similarity functions $s_k$( ) used in Equation 1, and the selections of their specificity values, may be as follows. In addition, we further $s_1$—Given the path of the URL associated to r, the normalized edit distance between the path and the CPT's median URL path $t_1$ may be measured. The URL path specificity $\sigma_1$ may be computed as discussed above.

$s_{2a}$—A Jaccard similarity between the set of parameter names in the URL query-string of r and the set of names in $t_2$ may be measured. The specificity of the parameter names $\sigma_{2a}$ may be equal to $\sigma_2$.

$s_{2b}$—The data types and lengths of the values in the generalized URL query-string parameters may be compared. For each element of the query string, a score of one may be assigned if its data type in r matches the data type recorded in $t_2$. Furthermore, the ratio between the value length in r and in $t_2$ may be computed. Finally, $s_{2b}$ may be computed by averaging all these scores, wherein the more data types and lengths that match, the higher the similarity score. As in $s_{2a}$, $\sigma_{2b}$ may be equal to $\sigma_2$.

$s_3$—The normalized edit distance between the (generalized) user-agent string in r and each of the strings in the set $t_3$ may be computed. Let $d_m$ be the smallest of such distances, where m is the closets of the template's user-agent strings. Define $s_3=1-d_m$ and set the specificity $\sigma_3=\sigma_{3;m}$.

$s_4$—Given the remaining request header fields in r, the similarity may be measured from different perspectives. First, a Jaccard similarity j between the set of headers in r and the set $t_4$ may be computed. Furthermore, the order of the headers as they appear in r and in the requests from which t was derived may be considered. If the order matches, a variable o=1 may be set, otherwise o=0. Finally, for each header, the ratio between the length of its value as it appears in r and in $t_5$, respectively, may be compared. The similarity $s_4$ may be defined as the average of all these partial similarity scores (i.e., of j, o, and the length ratios). The specificity score may be set as $\sigma_5=\min_i\{\sigma_{5,hdi}\}$ where the hdl are the request headers.

s5—Let p be the destination IP of request r. If p resides within any of the /24 network prefixes in $t_5$, $s_5=1$, otherwise $s_5=0$. Assume p is within prefix $net_5$ (in which case $s_5=1$). In this case, the specificity may be set as $\sigma_5=\sigma_{5,n}$.

The dynamic weights $w_k(\ )$ may be computed according to Equation 2: $\omega_k(s_k,\sigma_k)=\acute{\omega}_k(I+(1/(2-s_k*\sigma_k)^n))$, where $\acute{\omega}_k$ is a static weight (i.e., it takes a fixed value), and n is a configuration parameter. Notice that $\omega_k\epsilon(\acute{\omega}_k(1+1/2^n),2\acute{\omega}_k)$, and that these weights are effectively normalized by the denominator of Equation 1, thus resulting in $S(r,t)\epsilon[0,1]$.

The dynamic weights may be used to give higher weight to components of a request r that match their respective counterpart in a CPT with both high similarity and high specificity. In fact, the weight may be maximum when both the similarity and specificity are equal to one, and may tend to the minimum when either the similarity or specificity (or both) tend to zero.

Figure 6:
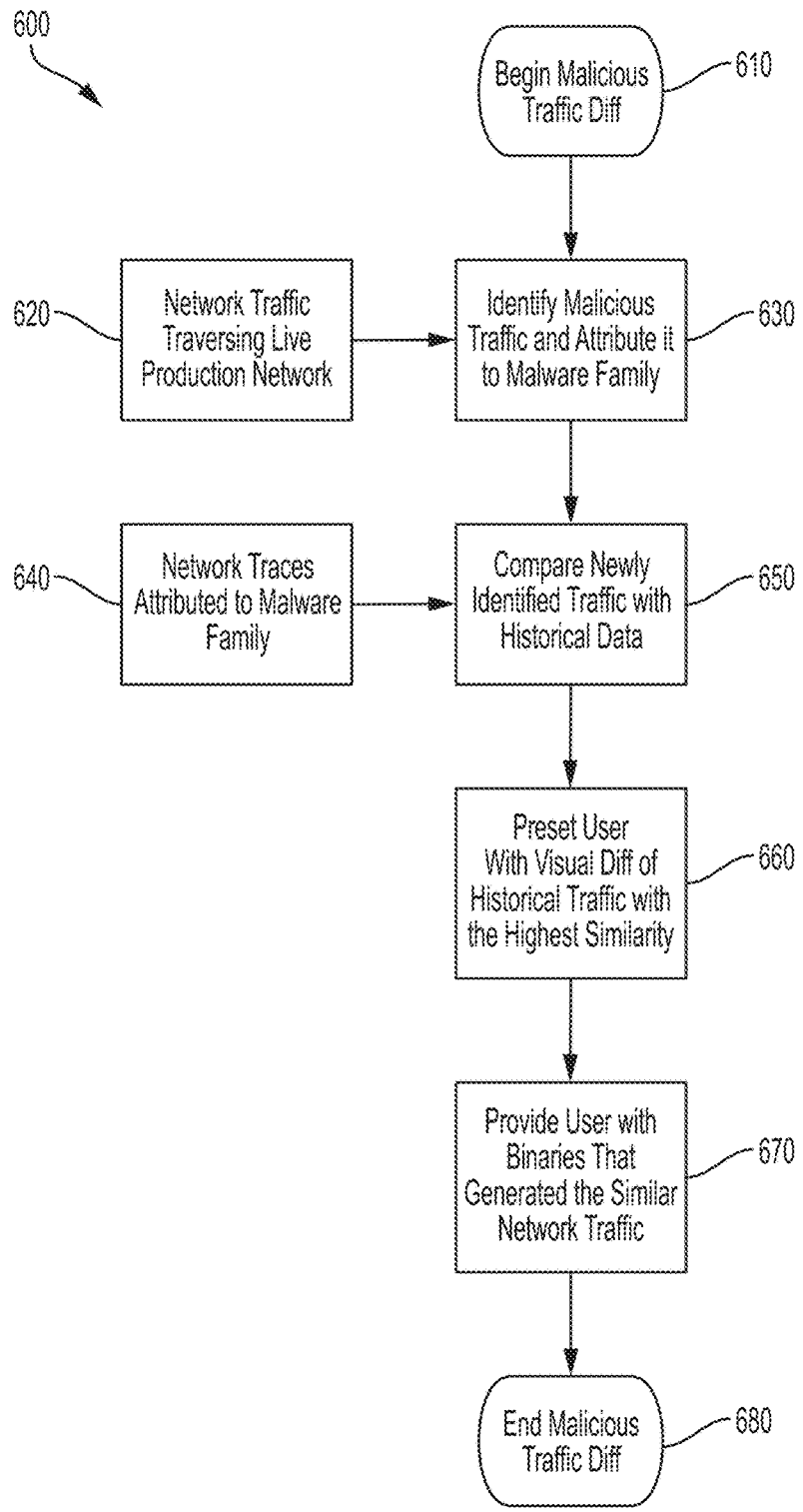
FIG. 6 is a traffic comparison process according to an embodiment of the invention.

FIG. 6 is a traffic comparison process 600 according to an embodiment of the invention. This process 600 may be used to provide a user with a report about identified malicious traffic. In 610, the process 600 may begin. In 620, the malicious traffic diff module 230 may receive network traffic, and in 630 the malicious traffic diffmodule 230 may identify malicious traffic within the network traffic and attribute it to a malware family as described above. Note that in some embodiments, the malicious traffic diff module 230 may receive this attribution from other modules (e.g., the traffic classification module 215), In 640, the malicious traffic diff module 230 may receive network traces attributed to the malware family, and in 650 the malicious traffic diff module 230 may compare the newly identified traffic with historical malware data. In 660, the malicious traffic diff module 230 may generate a visual diff report and present it to a user. This diff may include a visual representation of historical traffic with high similarity to the recently identified traffic and may be displayed via a computer display for example. In 670, the malicious traffic diffmodule 230 may provide the binaries that generated the similar network traffic to the user. The user may be able to use this information to identify and/or analyze network threats. In 680, the process may end. Note that in some embodiments, some portions of the process 600 may be performed by other modules in addition to and/or in place of the malicious traffic diffmodule 230, for example the traffic classification module 215.

Figure 7:
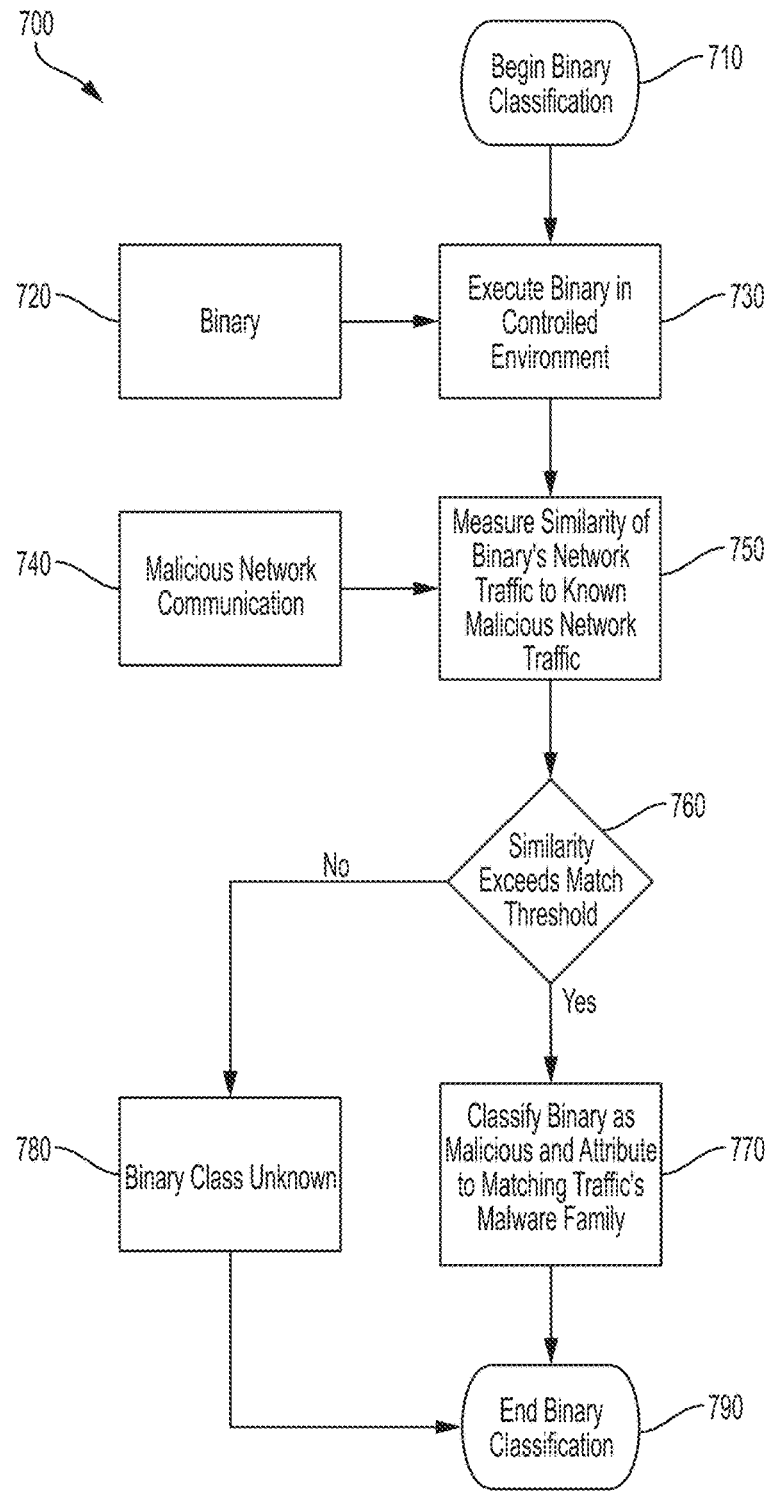
FIG. 7 is a binary classification process according to an embodiment of the invention.

FIG. 7 is a binary classification process 700 according to an embodiment of the invention. In 710, the binary classification module 210 may begin the binary classification process 700. Note that this process may be performed after CPTs have been generated as described above. In 720, the binary classification module 210 may receive a binary to be analyzed. In 730, the binary classification module 210 may execute the binary in a controlled environment to determine its behavior. In 740, the binary classification module 210 may receive or access known malicious network communication, which may be part of a CPT for example. In 750, the binary classification module 210 may measure the similarity of the binary's network traffic from the controlled execution to the known malicious traffic. In 760, the binary classification module 210 may determine whether the similarity of the traffic exceeds a match threshold. If so, in 770 the binary classification module 210 may classify the binary as malicious and attribute it to the family of the matching known malicious malware traffic. If not, in 780 the binary classification module 210 may determine that the binary has an unknown class. After classification, in 790 the process 400 may end. Note that in some embodiments, some portions of the process 700 may be performed by other modules in addition to and/or in place of the binary classification module 210, for example the traffic classification module 215.

Figure 8:
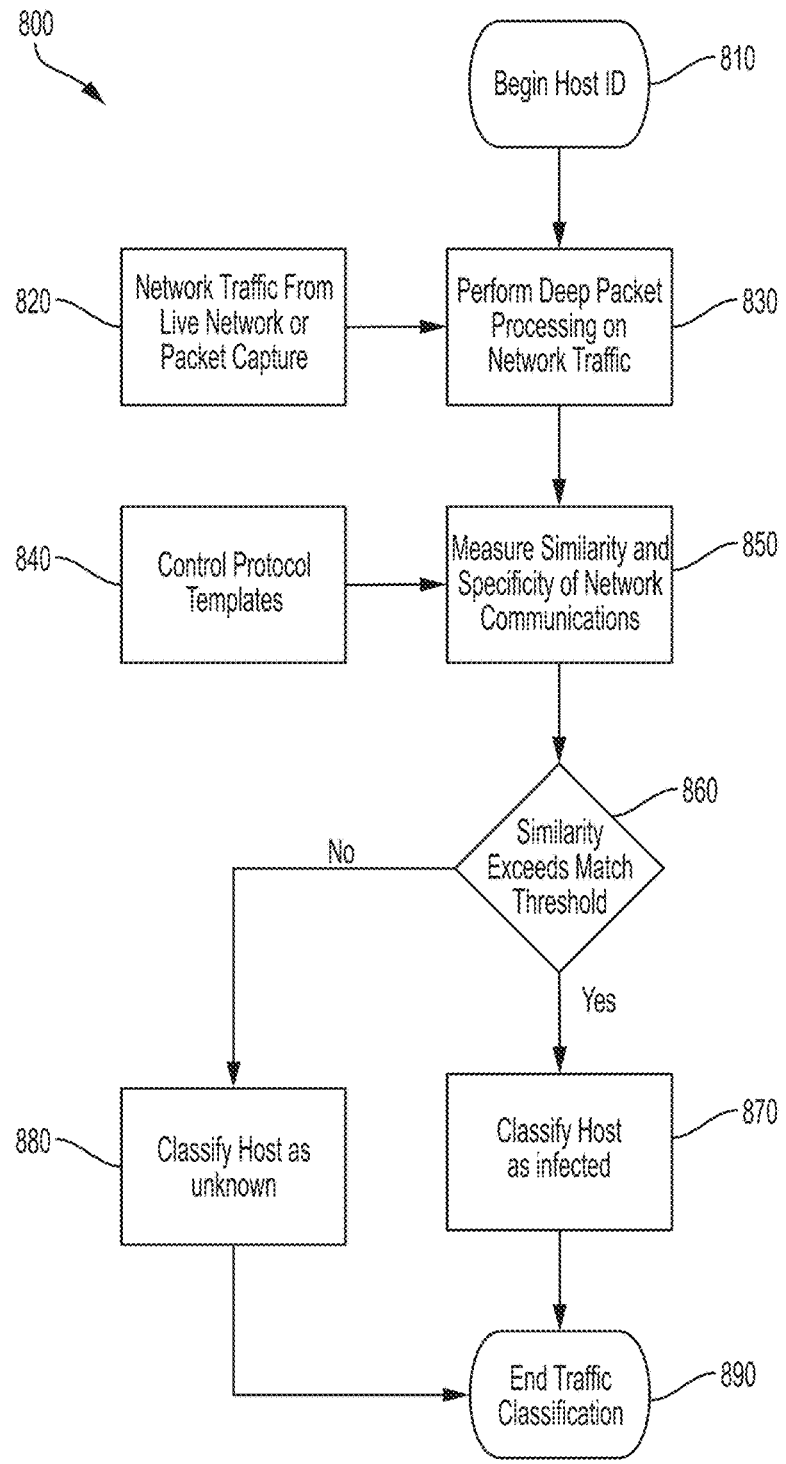
FIG. 8 is a host identification process according to an embodiment of the invention.

FIG. 8 is a host identification process 800 according to an embodiment of the invention. In 810, the infected host identification module 240 may begin the identification process 800. Note that this process may be performed after CPTs have been generated. CPT generation is described in greater detail above. In 820, the infected host identification module 240 may receive network traffic from live network monitoring and/or packet capture. In 830, the infected host identification module 240 may perform deep packet processing on the network traffic to determine the properties of the communications for comparison to CPTs. For example, the identified properties may include host identity (e.g., IP address), so that hosts may be associated with CPTs as described below. Also note that in some embodiments, deep packet processing may be performed elsewhere, and the results may be used by the infected host identification module 240. In 840, the infected host identification module 240 may receive or access the CPTs. In 850, the infected host identification module 240 may measure the similarity and specificity of the monitored and processed network communications in relation to one or more CPTs. In 860, the infected host identification module 240 may determine whether the similarity of the traffic exceeds a match threshold for one or more CPTs. If so, in 870 the infected host identification module 240 may classify the host as infected and associate it with the matching CPT malware family(ies). If not, in 880 the infected host identification module 240 may determine that the host has an unknown class. After classification, in 890 the process 800 may end. Note that in some embodiments, some portions of the process 800 may be performed by other modules in addition to and/or in place of the infected host identification module 240, for example the traffic classification module 215.

Figure 9:
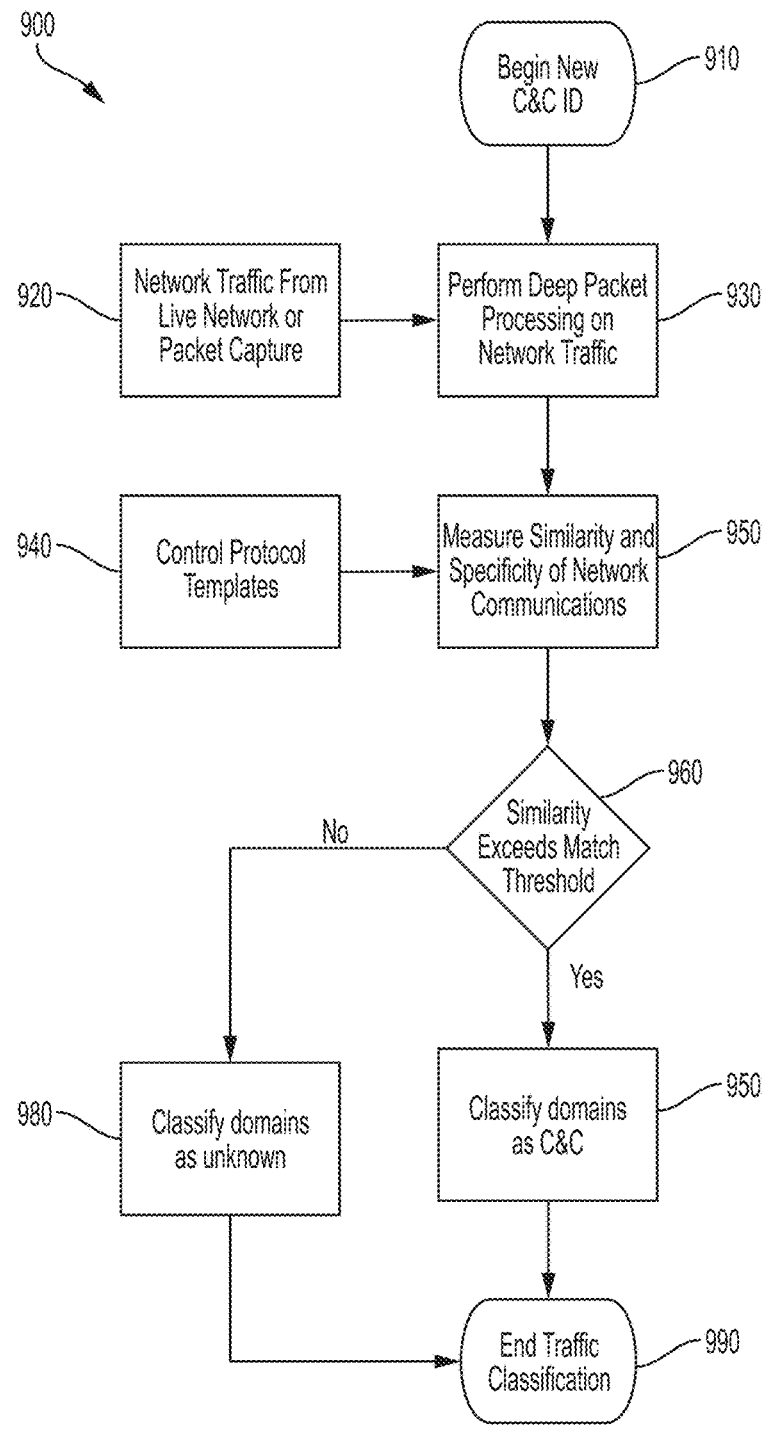
FIG. 9 is a protocol identification process according to an embodiment of the invention.

FIG. 9 is a C&C protocol identification process 900 according to an embodiment of the invention. In 910, the C&C domain identification module 250 may begin the identification process 900. Note that this process may be performed after CPTs have been generated. CPT generation is described in greater detail above. In 920, the C&C domain identification module 250 may receive network traffic from live network monitoring and/or packet capture. In 930, the C&C domain identification module 250 may perform deep packet processing on the network traffic to determine the properties of the communications for comparison to CPTs. Also note that in some embodiments, deep packet processing may be performed elsewhere, and the results may be used by the C&C domain identification module 250. In 940, the C&C domain identification module 250 may receive or access the CPTs. In 950, the C&C domain identification module 250 may measure the similarity and specificity of the monitored and processed network communications in relation to one or more CPTs. In 960, the C&C domain identification module 250 may determine whether the similarity of the traffic exceeds a match threshold for one or more CPTs. If so, in 970 the C&C domain identification module 250 may classify the traffic and/or a domain associated with the traffic as C&C traffic/domain and associate it with the matching CPT class(es). For example, the traffic may match the CPTs in such a way that it can be identified as C&C traffic. Thus, a domain associated with the traffic may be labeled as a C&C domain and attributed to the matching CPT malware family(ies). If not, in 980 the C&C domain identification module 250 may determine that the traffic and/or domain has an unknown class. After classification, in 990 the process 900 may end. Note that in some embodiments, some portions of the process 900 may be performed by other modules in addition to and/or in place of the C&C domain identification module 250, for example the traffic classification module 215.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Furthermore, although the term "at least one" may often be used in the specification, claims and drawings, the terms "a", "an", "the", "said", etc. also signify "at least one" or "the at least one" in the specification, claims and drawings. Additionally, the terms "including" and "comprising" in the specification, claims and drawings signify "including, but not limited to."

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method of classifying network traffic comprising:
    performing processing associated with monitoring, with a domain identification module in communication with a processor circuit and a network, network traffic;
    performing processing associated with comparing, with a traffic classification module in communication with the processor circuit and the domain identification module, the network traffic with a control protocol template (CPT) stored in a database in communication with the domain identification module and the processor circuit;
    when a similarity between the monitored traffic and the CPT exceeds a match threshold, performing processing associated with associating, with the domain identification module, the monitored traffic with the CPT;
    when the similarity between the monitored traffic and the CPT does not exceed the match threshold, performing processing associated with identifying, with the traffic classification module, the monitored traffic as having an unknown classification;
    performing processing associated with monitoring, with a CPT generation module in communication with the processor circuit and the network, traffic on the network to identify malicious traffic;
    performing processing associated with clustering, with the CPT generation module, identified associated traffic into a cluster including one or more similar network requests;
    performing processing associated with generating, with the CPT generation module, a CPT associated with the cluster, the CPT including information allowing a network request similar to the one or more network requests of the cluster to be identified based on the CPT; and
    performing processing associated with combining, with the CPT generation module, the CPT with a second CPT associated with a second cluster of one or more network requests similar to the network requests associated with the CPT.

2. The method of claim 1, wherein:
    performing processing associated with associating, with the traffic classification module, the monitored traffic with the CPT comprises identifying the monitored traffic as malicious and attributing the monitored traffic to a malware family associated with the CPT; and
    the CPT comprises malicious traffic data associated with the malware family and previously observed network traffic data.

3. The method of claim 2, wherein:
    performing processing associated with comparing, with the traffic classification module, the network traffic with the CPT comprises comparing the network traffic with a plurality of CPTs, wherein each of the plurality of CPTs comprises a different set of malicious traffic data; and
    performing processing associated with attributing, with the traffic classification module, the network traffic to a malware family associated with the CPT comprises attributing the network traffic to at least one malware family associated with at least one of the CPTs.

4. The method of claim 2, further comprising:
    performing processing associated with executing, with a binary classification module in communication with the processor circuit, the network, and the traffic classification module, a binary in a controlled environment and monitoring network traffic associated with the binary;
    performing processing associated with comparing, with the binary classification module, the network traffic associated with the binary to the CPT;
    when a similarity between the network traffic associated with the binary and the CPT exceeds a match threshold, performing processing associated with classifying, with the binary classification module, the binary as malicious and attributing the binary to a malware family associated with the CPT; and
    when the similarity between the network traffic associated with the binary and CPT does not exceed the match threshold, performing processing associated with classifying, with the binary classification module, the binary as having an unknown maliciousness.

5. The method of claim 1, further comprising:
    performing processing associated with adding, with the CPT generation module, the CPT to the database.

6. The method of claim 1, further comprising:
    performing processing associated with distributing, with the CPT generation module, the CPT to a remote computer in communication with the CPT generation module and the processor circuit via the network.

7. The method of claim 2, further comprising:
    performing processing associated with identifying, with an infected host identification module in communication with the processor circuit, a host which transmitted the monitored traffic and labeling the host as infected and/or attributing the host infection to a malware family.

8. The method of claim 2, wherein:
    performing processing associated with identifying, with the domain identification module in communication with the processor circuit, a domain associated with the monitored traffic and labeling the domain as malicious and/or attributing the domain to a malware family.

9. A method of comparing network traffic comprising:
performing processing associated with comparing, with a malicious traffic comparison module in communication with a processor circuit and a network, malicious traffic of interest with historical malicious traffic data;
performing processing associated with generating, with the malicious traffic comparison module, a report comprising the results of the comparison;
performing processing associated with identifying, with the malicious traffic comparison module, a binary associated with the historical malicious traffic data;
performing processing associated with monitoring, with a control protocol template (CPT) generation module in communication with the processor circuit and the network, traffic on the network to identify malicious traffic;
performing processing associated with clustering, with the CPT generation module, identified malicious traffic into a cluster including one or more similar network requests;
performing processing associated with generating, with the CPT generation module, a CPT associated with the cluster, the CPT including information allowing a network request similar to the one or more network requests of the cluster to be identified based on the CPT; and
performing processing associated with combining, with the CPT generation module, the CPT with a second CPT associated with a second cluster of one or more network requests similar to the network requests associated with the CPT.

10. The method of claim 9, wherein the report comprises a visual comparison of the known malicious traffic and a portion of the historical malicious traffic data with a highest similarity to the malicious traffic of interest.

11. The method of claim 9, wherein the identified binary is associated with a portion of the historical malicious traffic data with a highest similarity to the malicious traffic of interest.

12. The method of claim 9, further comprising:
performing processing associated with identifying, with the malicious traffic comparison module, a system trace and/or a network trace associated with the binary.

13. The method of claim 9, further comprising:
performing processing associated with monitoring, with a traffic classification module in communication with the processor circuit, the network, and the malicious traffic comparison module, network traffic;
performing processing associated with comparing, with the traffic classification module, the network traffic with a CPT stored in a database in communication with the binary classification module and the processor circuit;
when a similarity between the monitored traffic and the CPT exceeds a match threshold, performing processing associated with identifying, with the traffic classification module, the monitored traffic as malicious and attributing the monitored traffic to a malware family associated with the CPT; and
when the similarity between the monitored traffic and the CPT does not exceed the match threshold, performing processing associated with identifying, with the traffic classification module, the monitored traffic as having an unknown maliciousness,
wherein the CPT comprises malicious traffic data associated with the malware family and previously observed network traffic data.

14. The method of claim 13, wherein:
performing processing associated with comparing, with the traffic classification module, the network traffic with the CPT comprises comparing the network traffic with a plurality of CPTs, wherein each of the plurality of CPTs comprises a different set of malicious traffic data; and
performing processing associated with attributing, with the traffic classification module, the network traffic to a malware family associated with the CPT comprises attributing the network traffic to at least one malware family associated with at least one of the CPTs.

15. The method of claim 9, further comprising:
performing processing associated with executing, with a binary classification module in communication with the processor circuit, the network, and the malicious traffic comparison module, a binary in a controlled environment and monitoring network traffic associated with the binary;
performing processing associated with comparing, with the binary classification module, the network traffic associated with the binary to the CPT;
when a similarity between the network traffic associated with the binary and the CPT exceeds a match threshold, performing processing associated with classifying, with the binary classification module, the binary as malicious and attributing the binary to a malware family associated with the CPT; and
when the similarity between the network traffic associated with the binary and CPT does not exceed the match threshold, performing processing associated with classifying, with the binary classification module, the binary as having an unknown maliciousness.

16. The method of claim 9, further comprising:
performing processing associated with adding, with the CPT generation module, the CPT to the database.

17. The method of claim 9, further comprising:
performing processing associated with distributing, with the CPT generation module, the CPT to a remote computer in communication with the CPT generation module and the processor circuit via the network.

18. The method of claim 9, wherein:
the previously observed network traffic data comprises data indicating a frequency for each of a plurality of network traffic types; and
the match threshold is based on the frequencies, wherein a match threshold associated with one of the plurality of network traffic types having a relatively high frequency is higher than a match threshold associated with one of the plurality of network traffic types having a relatively low frequency.

* * * * *